(12) United States Patent
Trotta et al.

(10) Patent No.: US 11,336,026 B2
(45) Date of Patent: *May 17, 2022

(54) RADIO FREQUENCY SYSTEM FOR WEARABLE DEVICE

(71) Applicant: Infineon Technologies AG, Neubiberg (DE)

(72) Inventors: Saverio Trotta, Munich (DE); Ashutosh Baheti, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 693 days.

This patent is subject to a terminal disclaimer.

(21) Appl. No.: 16/217,944

(22) Filed: Dec. 12, 2018

(65) Prior Publication Data
US 2019/0123453 A1 Apr. 25, 2019

Related U.S. Application Data

(63) Continuation of application No. 15/216,273, filed on Jul. 21, 2016, now Pat. No. 10,181,653.

(51) Int. Cl.
| | |
|---|---|
| *H01Q 1/42* | (2006.01) |
| *H01Q 19/30* | (2006.01) |
| *G01S 13/88* | (2006.01) |
| *G06F 3/01* | (2006.01) |
| *H01Q 1/22* | (2006.01) |
| *H01Q 1/27* | (2006.01) |

(Continued)

(52) U.S. Cl.
CPC ............ *H01Q 19/30* (2013.01); *G01S 13/88* (2013.01); *G06F 3/017* (2013.01); *H01Q 1/2283* (2013.01); *H01Q 1/243* (2013.01); *H01Q 1/273* (2013.01); *H01Q 15/14* (2013.01); *H04B 1/385* (2013.01); *G01S 7/028* (2021.05)

(58) Field of Classification Search
None
See application file for complete search history.

(56) References Cited

U.S. PATENT DOCUMENTS

| | | | |
|---|---|---|---|
| 4,241,347 A | 12/1980 | Albanese et al. | |
| 6,147,572 A | 11/2000 | Kaminski et al. | |
| (Continued) | | | |

FOREIGN PATENT DOCUMENTS

| | | |
|---|---|---|
| CN | 1463161 A | 12/2003 |
| CN | 1716695 A | 1/2006 |
| (Continued) | | |

OTHER PUBLICATIONS

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.

(Continued)

*Primary Examiner* — Trinh V Dinh
(74) *Attorney, Agent, or Firm* — Slater Matsil, LLP

(57) ABSTRACT

A radio frequency (RF) system includes an RF integrated circuit (IC) die, and an antenna coupled to the RF IC die. The RF system further includes a reflector layer over the RF IC die, the reflector layer extending over at least a portion of the antenna, a combination of the antenna and the reflector layer having a radiation pattern that comprises a main lobe in a first direction parallel to a top surface of the reflector layer.

20 Claims, 18 Drawing Sheets

(51) Int. Cl.
  *H01Q 1/24* (2006.01)
  *H01Q 15/14* (2006.01)
  *H04B 1/3827* (2015.01)
  *G01S 7/02* (2006.01)

(56) References Cited

U.S. PATENT DOCUMENTS

| | | |
|---|---|---|
| 6,414,631 B1 | 7/2002 | Fujimoto |
| 6,636,174 B2 | 10/2003 | Arikan et al. |
| 7,048,973 B2 | 5/2006 | Sakamoto et al. |
| 7,057,564 B2 | 6/2006 | Tsai et al. |
| 7,171,052 B2 | 1/2007 | Park |
| 7,317,417 B2 | 1/2008 | Arikan et al. |
| 7,596,241 B2 | 9/2009 | Rittscher et al. |
| 7,692,574 B2 | 4/2010 | Nakagawa |
| 7,873,326 B2 | 1/2011 | Sadr |
| 7,889,147 B2 | 2/2011 | Tam et al. |
| 8,228,382 B2 | 7/2012 | Pattikonda |
| 8,411,444 B2 | 4/2013 | Gaynes et al. |
| 8,497,805 B2 | 7/2013 | Rofougaran et al. |
| 8,659,369 B2 | 2/2014 | Rofougaran et al. |
| 8,731,502 B2 | 5/2014 | Salle et al. |
| 8,836,596 B2 | 9/2014 | Richards et al. |
| 8,847,814 B2 | 9/2014 | Himmelstoss et al. |
| 8,860,532 B2 | 10/2014 | Gong et al. |
| 8,952,521 B2 | 2/2015 | Wojnowski et al. |
| 8,976,061 B2 | 3/2015 | Chowdhury |
| 9,172,132 B2 | 10/2015 | Kam et al. |
| 9,182,476 B2 | 11/2015 | Wintermantel |
| 9,202,105 B1 | 12/2015 | Wang et al. |
| 9,413,079 B2 | 8/2016 | Kamgaing et al. |
| 9,495,600 B2 | 11/2016 | Heu et al. |
| 9,886,095 B2 | 2/2018 | Pothier |
| 9,935,065 B1 | 4/2018 | Baheti et al. |
| 10,181,653 B2 * | 1/2019 | Trotta ................ H01Q 1/273 |
| 2003/0179127 A1 | 9/2003 | Wienand |
| 2004/0238857 A1 | 12/2004 | Beroz et al. |
| 2006/0001572 A1 | 1/2006 | Gaucher et al. |
| 2006/0049995 A1 | 3/2006 | Imaoka et al. |
| 2006/0067456 A1 | 3/2006 | Ku et al. |
| 2007/0210959 A1 | 9/2007 | Herd et al. |
| 2008/0106460 A1 | 5/2008 | Kurtz et al. |
| 2008/0238759 A1 | 10/2008 | Carocari et al. |
| 2008/0291115 A1 | 11/2008 | Doan et al. |
| 2008/0308917 A1 | 12/2008 | Pressel et al. |
| 2009/0073026 A1 | 3/2009 | Nakagawa |
| 2009/0085815 A1 | 4/2009 | Jakab et al. |
| 2009/0153428 A1 | 6/2009 | Rofougaran et al. |
| 2009/0315761 A1 | 12/2009 | Walter et al. |
| 2010/0207805 A1 | 8/2010 | Haworth |
| 2010/0240327 A1 | 9/2010 | Lambrecht et al. |
| 2011/0285606 A1 | 11/2011 | De Graauw et al. |
| 2011/0299433 A1 | 12/2011 | Darabi et al. |
| 2012/0087230 A1 | 4/2012 | Guo et al. |
| 2012/0092284 A1 | 4/2012 | Rofougaran et al. |
| 2012/0116231 A1 | 5/2012 | Liao et al. |
| 2012/0195161 A1 | 8/2012 | Little et al. |
| 2012/0206339 A1 | 8/2012 | Dahl |
| 2012/0280900 A1 | 11/2012 | Wang et al. |
| 2013/0027240 A1 | 1/2013 | Chowdhury |
| 2013/0106673 A1 | 5/2013 | McCormack et al. |
| 2013/0207274 A1 | 8/2013 | Liu et al. |
| 2014/0028542 A1 | 1/2014 | Lovitt et al. |
| 2014/0070994 A1 | 3/2014 | Schmalenberg et al. |
| 2014/0110840 A1 | 4/2014 | Wojnowski et al. |
| 2014/0145883 A1 | 5/2014 | Baks et al. |
| 2014/0324888 A1 | 10/2014 | Xie et al. |
| 2015/0035714 A1 | 2/2015 | Zhou |
| 2015/0177373 A1 | 6/2015 | Boeck et al. |
| 2015/0181840 A1 | 7/2015 | Tupin, Jr. et al. |
| 2015/0185316 A1 | 7/2015 | Rao et al. |
| 2015/0212198 A1 | 7/2015 | Nishio et al. |
| 2015/0243575 A1 | 8/2015 | Strothmann et al. |
| 2015/0277569 A1 | 10/2015 | Sprenger et al. |
| 2015/0280327 A1 | 10/2015 | Spella |
| 2015/0325925 A1 | 11/2015 | Kamgaing et al. |
| 2015/0346820 A1 | 12/2015 | Poupyrev et al. |
| 2015/0348821 A1 | 12/2015 | Iwanaga et al. |
| 2015/0364816 A1 | 12/2015 | Murugan et al. |
| 2016/0018511 A1 | 1/2016 | Nayyar et al. |
| 2016/0041617 A1 | 2/2016 | Poupyrev |
| 2016/0041618 A1 | 2/2016 | Poupyrev |
| 2016/0061942 A1 | 3/2016 | Rao et al. |
| 2016/0061947 A1 | 3/2016 | Patole et al. |
| 2016/0098089 A1 | 4/2016 | Poupyrev |
| 2016/0103213 A1 | 4/2016 | Ikram et al. |
| 2016/0109566 A1 | 4/2016 | Liu et al. |
| 2016/0118353 A1 | 4/2016 | Ahrens et al. |
| 2016/0146931 A1 | 5/2016 | Rao et al. |
| 2016/0146933 A1 | 5/2016 | Rao et al. |
| 2016/0178730 A1 * | 6/2016 | Trotta ................ G01S 7/354 |
| | | 342/175 |
| 2016/0187462 A1 | 6/2016 | Altus et al. |
| 2016/0191232 A1 | 6/2016 | Subburaj et al. |
| 2016/0240907 A1 | 8/2016 | Haroun |
| 2016/0249133 A1 | 8/2016 | Sorensen |
| 2016/0252607 A1 | 9/2016 | Saboo et al. |
| 2016/0259037 A1 | 9/2016 | Molchanov et al. |
| 2016/0266233 A1 | 9/2016 | Mansour |
| 2016/0269815 A1 | 9/2016 | Liao et al. |
| 2016/0291130 A1 | 10/2016 | Ginsburg et al. |
| 2016/0299215 A1 | 10/2016 | Dandu et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0327633 A1 | 11/2016 | Kumar Y.B. et al. |
| 2016/0334502 A1 | 11/2016 | Ali et al. |
| 2016/0349845 A1 | 12/2016 | Poupyrev et al. |
| 2017/0033062 A1 | 2/2017 | Liu et al. |
| 2017/0045607 A1 | 2/2017 | Bharadwaj et al. |
| 2017/0052618 A1 | 2/2017 | Lee et al. |
| 2017/0054449 A1 | 2/2017 | Mani et al. |
| 2017/0060254 A1 | 3/2017 | Molchanov et al. |
| 2017/0070952 A1 | 3/2017 | Balakrishnan et al. |
| 2017/0074974 A1 | 3/2017 | Rao et al. |
| 2017/0074980 A1 | 3/2017 | Adib et al. |
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0139036 A1 | 5/2017 | Nayyar et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0236776 A1 | 8/2017 | Huynh et al. |
| 2017/0364160 A1 | 12/2017 | Malysa et al. |
| 2018/0013205 A1 * | 1/2018 | Rosenauer ........... H01Q 1/2283 |
| 2018/0046255 A1 | 2/2018 | Rothera et al. |
| 2018/0071473 A1 | 3/2018 | Trotta et al. |
| 2018/0074173 A1 * | 3/2018 | Trotta ................ G01S 13/584 |
| 2018/0101239 A1 | 4/2018 | Yin et al. |
| 2018/0277963 A1 * | 9/2018 | Desclos ................ H01Q 3/44 |
| 2018/0372844 A1 * | 12/2018 | Jungmaier ............. G01S 13/06 |

FOREIGN PATENT DOCUMENTS

| | | |
|---|---|---|
| CN | 101490578 A | 7/2009 |
| CN | 101585361 A | 11/2009 |
| CN | 101751126 A | 6/2010 |
| CN | 101809814 A | 8/2010 |
| CN | 102217064 A | 10/2011 |
| CN | 102664303 A | 9/2012 |
| CN | 102788969 A | 11/2012 |
| CN | 102967854 A | 3/2013 |
| CN | 103529444 A | 1/2014 |
| CN | 203950036 U | 11/2014 |
| CN | 104730516 A | 6/2015 |
| CN | 205028454 U | 2/2016 |
| DE | 102008054570 A1 | 6/2010 |
| DE | 102011075725 A1 | 11/2012 |
| DE | 102014118063 A1 | 7/2015 |
| GB | 2247799 A | 3/1992 |

(56) References Cited

FOREIGN PATENT DOCUMENTS

| | | |
|---|---|---|
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |

OTHER PUBLICATIONS

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://iap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Killedar, Abdulraheem "XWR1xxx Power Management Optimizations—Low Cost LC Filter Solution," Application Report SWRA577, Texas Instruments, Oct. 2017, 19 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Richards, Mark A., "Fundamentals of Radar Signal Processing," McGraw Hill Electronic Engineering, ISBN: 0-07-144474-2, Jun. 2005, 93 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.

Suleymanov, Suleyman, "Design and Implementation of an FMCW Radar Signal Processing Module for Automotive Applications," Master Thesis, University of Twente, Aug. 31, 2016, 61 pages.

Thayananthan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, 11 pages.

* cited by examiner

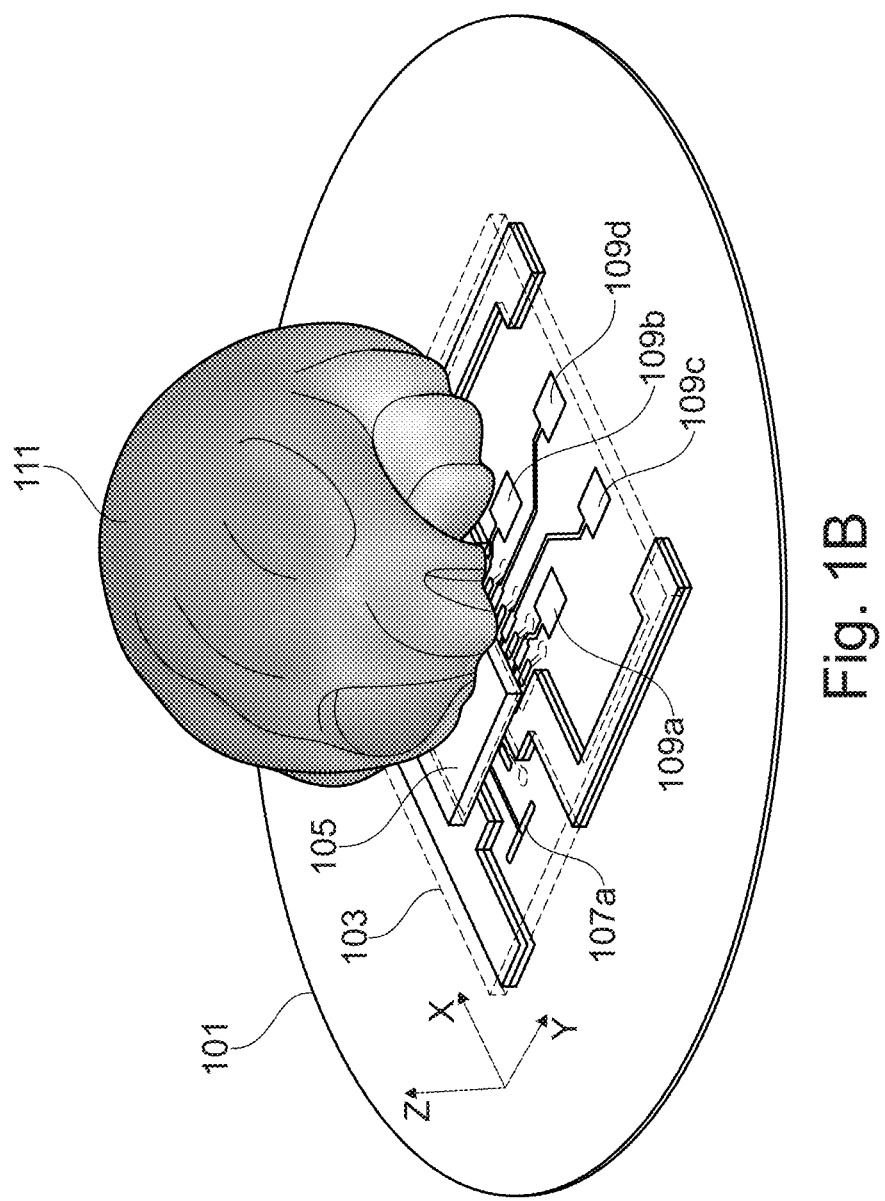

RADIO FREQUENCY SYSTEM FOR WEARABLE DEVICE

CROSS-REFERENCE TO RELATED APPLICATIONS

This application is a continuation and claims the benefit of U.S. patent application Ser. No. 15/216,273, filed on Jul. 21, 2016, which application is hereby incorporated herein by reference in its entirety.

TECHNICAL FIELD

The present disclosure relates generally to an electronic device, and more particularly to a radio frequency (RF) system with an RF integrated circuit (RFIC) and an antenna system to be utilized in a wearable device.

BACKGROUND

Applications in the millimeter-wave frequency regime have gained significant interest in the past few years due to the rapid advancement in low cost semiconductor technologies such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for mm-wave applications at 60 GHz, 77 GHz, and 80 GHz, and also beyond 100 GHz. Such applications include, for example, automotive radar systems, multi-gigabit communication systems, and wearable consumer devices such as smart watches, activity monitors and health monitors.

In some radar systems, the distance between the radar and a target is determined by transmitting a frequency modulated signal, receiving a reflection of the frequency modulated signal, and determining a distance based on a time delay and/or frequency difference between the transmission and reception of the frequency modulated signal. Accordingly, some radar systems include a transmit antenna to transmit the RF signal, a receive antenna to receive the RF, as well as the associated RF circuitry used to generate the transmitted signal and to receive the RF signal. In some cases, multiple antennas may be used to implement directional beams using phased array techniques.

SUMMARY

According to an embodiment, a radio frequency (RF) system includes an RF integrated circuit (IC) die, and an antenna coupled to the RF IC die. The RF system further includes a reflector layer over the RF IC die, the reflector layer extending over at least a portion of the antenna, a combination of the antenna and the reflector layer having a radiation pattern that comprises a main lobe in a first direction parallel to a top surface of the reflector layer.

BRIEF DESCRIPTION OF THE DRAWINGS

For a more complete understanding of the present invention, and the advantages thereof, reference is now made to the following descriptions taken in conjunction with the accompanying drawings, in which:

FIG. 1B illustrates a perspective view of an RF circuitry/ antenna package mounted on a circuit board with a corresponding radiation pattern in accordance with some embodiments;

Figure 1A:
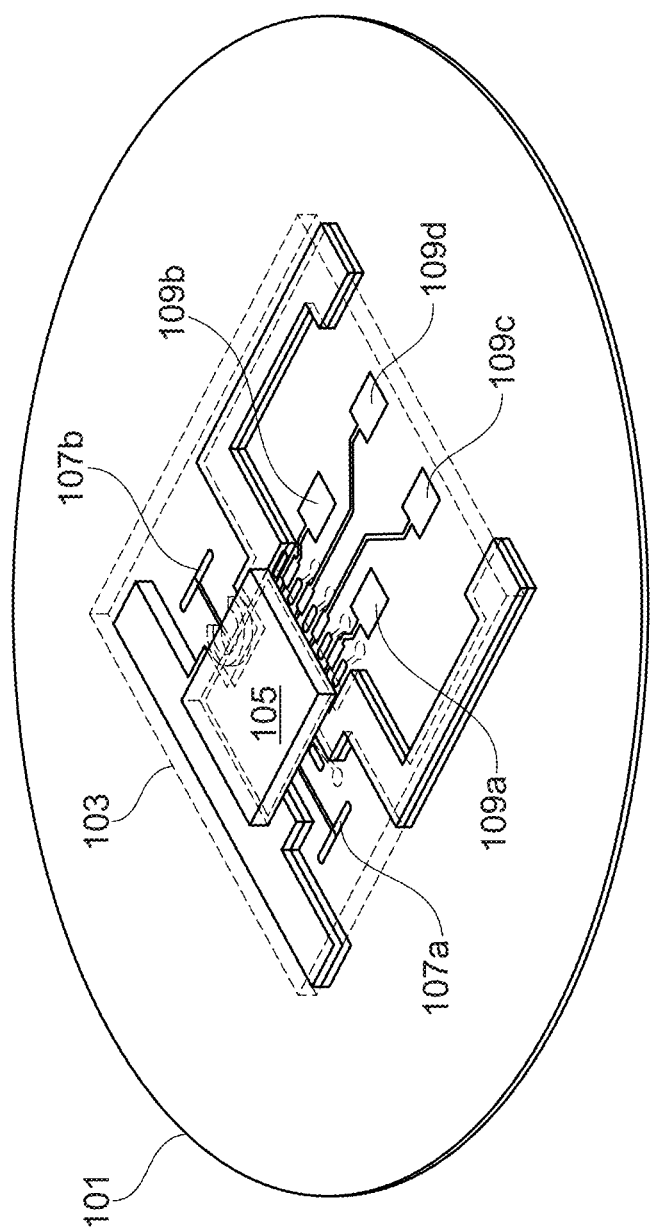
FIG. 1A illustrates a perspective view of an RF circuitry/ antenna package mounted on a circuit board in accordance with some embodiments.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present disclosure will be described with respect to embodiments in a specific context, a radio frequency (RF)

system including an RF integrated circuit (RFIC) and an antenna system. In particular, various embodiments below will be described with respect to an RF system that is a part of a gesture sensing system of a wearable consumer device such as, for example, a smart watch. Various embodiments presented herein may also be applied to other systems and applications, such as other wearable/portable consumer devices (such as health monitoring systems, activity monitoring systems, mobile phones, tablet devices, portable gaming consoles, photo cameras, video camcorders, laptop computers, notebook computers, or the like) and non-portable consumer devices (TV sets, gaming consoles, desktop computers, or the like).

In various embodiments presented herein, an RF system is provided, which may be integrated into a gesture sensing system of a wearable device. In various embodiments, the gesture sensing system may be implemented using mmwave RF circuits to produce a mm-wave gesture sensing system. In an embodiment, the gesture sensing system includes an RF system, including RF circuitry and antennas, which is implemented in a ball grid array (BGA) package. Such an RF circuitry/antenna package includes an integrated circuit having a receive interface on a first edge of chip and transmit interfaces on adjacent or opposite edges of the chip. A multi-element patch antenna is disposed on a surface of the package adjacent to the first edge of the chip, and is coupled to multiple receive channel interfaces at the first edge of the chip. Similarly, patch antennas for transmitting signals are disposed on the redistribution layer of the package on the adjacent or opposite edges of the chip adjacent to the transmit interfaces.

In some embodiments, beam forming concepts, which are widely used in radar systems, may be used to impart beam steering and directionality to the transmission and reception of RF signals. Such embodiments may be applied, for example, to automotive radar systems, camera systems, portable systems, wearable systems, TV sets, tablet computers, and other applications. Embodiment beam forming concepts may also be used to implement a gesture recognition system. In the past, gesture recognition systems have been implemented using optical cameras, pressure sensors, PALs and other devices. By using embodiment radar systems, a gesture recognition system may perform accurate distance measurements, while being conveniently hidden behind an opaque cover made of plastic or other sturdy materials.

In some embodiments, a gesture sensing system is integrated on a circuit board of a wearable device such as, for example, a smart watch. In an embodiment, an antenna of an RF circuitry/antenna package of the gesture sensing system is formed to have a radiation pattern such that the antenna transmits or receives RF signals in a direction that is not blocked by other components of a wearable device, such as a display of the wearable device. In another embodiment, an RF circuitry/antenna package of the gesture sensing system includes a reflector layer to modify a radiation pattern of an antenna of the RF circuitry/antenna package. The reflector layer reflects and/or suppresses transmission/reception of RF signals in undesired directions (such as, for example, a direction toward a display of a wearable device) and redirects the radiation energy to desired directions (such as, for example, a direction parallel to a display of a wearable device). In such embodiments, portions of a housing of the wearable device may be formed of a suitable material that is transparent for mm-wave RF signals.

FIG. 1A illustrates a perspective view of an RF circuitry/antenna package 103 mounted on a circuit board 101 in accordance with some embodiments. In an embodiment, the RF circuitry/antenna package 103 is mounted on the circuit board 101 using solder balls (not shown). The circuit board 101 may be implemented using an insulating substrate having one or more thin conductive layers (not individually shown) laminated on one or both sides of the insulating substrate. The one or more thin conductive layers are patterned (for example, etched) to form circuitry interconnections of the circuit board 101. The one or more thin conductive layers may be configured as ground, power and/or signal layers. In an embodiment, the insulating substrate is formed of $FR_4$ and the one or more thin conductive layers are formed of copper. Alternatively, other insulating materials, such as Rogers PCB material, or conductive materials may be used form the circuit board 101. In some embodiments, the circuit board 101 may include additional conductive and insulating layers as known in the art.

In an embodiment, the RF circuitry/antenna package 103 includes an RF front-end integrated circuit (IC) die 105, transmit antennas 107a and 107b, and receive antennas 109a-109d. The RF circuitry/antenna package 103 is configured to transmit an incident RF signal toward an object (such as, for example, a hand of a consumer when the RF circuitry/antenna package 103 is a part of a gesture sensing system of a wearable device) via transmit antennas 107a and 107b, and receive a reflected RF signal from the object via receive antennas 109a-109d. The RF front-end IC die 105 includes a receiver front end (not shown) coupled to the receive antennas 109a-109d and a transmitter front end (not shown) coupled to the transmit antennas 107a and 107b. In an embodiment, the transmit antennas 107a and 107b and the receive antennas 109a-109d are implemented using patch antennas. As described below in greater detail, the transmit antennas 107a and 107b and the receive antennas 109a-109d may be implemented using other type of antennas based on design requirements for the RF circuitry/antenna package 103. The RF front-end IC die 105 provides signals to be transmitted to the transmitter front end and receives and/or processes signals received by the receiver front end. In some embodiments, the frequency of operation of the RF circuitry/antenna package 103 is between about 57 GHz and about 66 GHz. Alternatively, embodiment systems may operate at frequencies outside of this range also.

As shown, the RF circuitry/antenna package 103 is an embedded wafer level (eWLB) ball grid array (BGA) package that includes a molding material layer. In such an embodiment, the RF front-end IC die 105 is disposed within the molding material layer. The RF circuitry/antenna package 103 may further include conductive layers, such as redistribution layers (RDLs), used for routing and/or for the implementation of various passive and/or active devices within the package. The transmit antennas 107a and 107b, and the receive antennas 109a-109d may be implemented using the RDLs. Alternatively, other package types such as a BGA package or advanced thin small leadless (ATSPL) package may also be used to implement the RF circuitry/antenna package 103.

FIG. 1B illustrates a perspective view of the RF circuitry/antenna package 103 mounted on the circuit board 101 with a corresponding radiation pattern 111 of the receive antennas 109a-109d in accordance with some embodiments. In an embodiment where the receive antennas 109a-109d are implemented using patch antennas, the radiation pattern in of the receive antennas 109a-109d has a "half-ball" shape disposed on a top surface of the RF circuitry/antenna package 103 above the receive antennas 109a-109d. The receive antennas 109a-109d are configured to receive RF signals from directions according the radiation pattern 111. Accordingly, an obstacle placed above the top surface of the RF circuitry/antenna package 103 may adversely affect the performance of the RF circuitry/antenna package 103 by blocking most sensitive (having highest gain) directions of the receive antennas 109a-109d.

Figure 2:
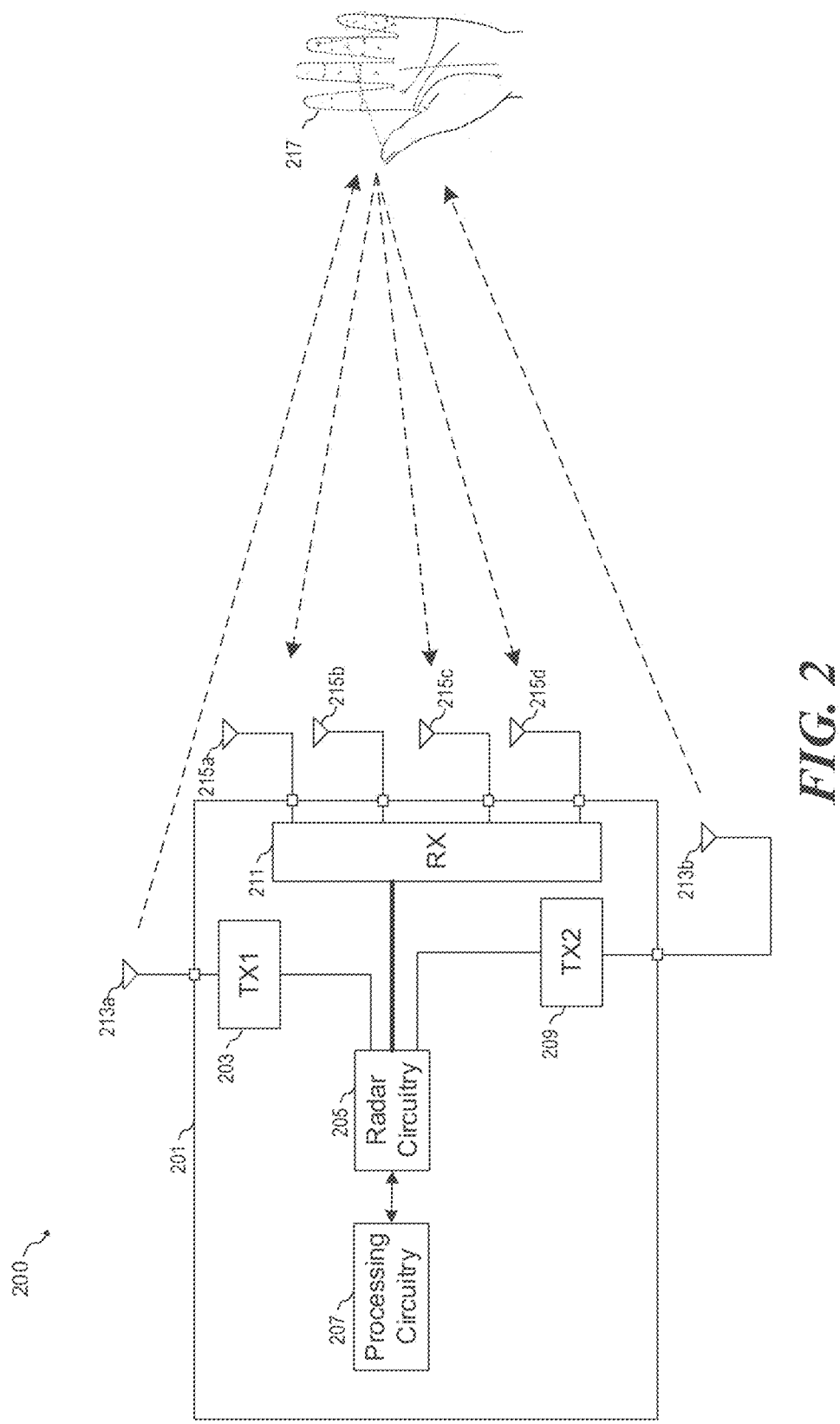
FIG. 2 illustrates a schematic diagram of a mm-wave gesture sensing system in accordance with some embodiments.

FIG. 2 illustrates a schematic diagram of a mm-wave gesture sensing system 200 in accordance with some embodiments. As shown, a radar transceiver device 201 is configured to transmit an incident RF signal toward a gesturing hand 217 via transmit antenna 213a and/or transmit antenna 213b, and receive a reflected RF signal via an antenna array that includes receive antennas 215a-215d. The radar transceiver device 201 includes a receiver front end 211 coupled to the receive antennas 215a-215d, a first transmitter front end 203 coupled to the transmit antenna 213a and a second transmitter front end 209 coupled to the transmit antenna 213b. Radar circuitry 205 provides signals to be transmitted to the first and second transmitter front ends 203 and 209, and receives signals via the receiver front end 211. Processing circuitry 207 processes the received signals, as well as controls the transmissions produced by the first transmitter front end 203 and the second transmitter front end 209. In some embodiments, the mm-wave gesture sensing system 200 is implemented as a frequency modulated continuous wave (FMCW) radar sensor having two transmit channels and four receive channels to realize a digital beam forming holographic radar such that a relative speed, distance, and phase of each target in the field of view (FOV) in front of the antennas is measured. In other embodiments, the number of transmit channels and the number of receive channels may vary according to design requirements for the mm-wave gesture sensing system 200.

During operation, position and gestures of a gesturing hand 217 may be detected by the radar transceiver device 201 and/or other processing circuitry coupled thereto. For example, the radar transceiver device 201 may be coupled to a wearable device, a computer system, an appliance, or other devices, and the detected gestures may be used as an input to such devices. For example, a gesture of two fingers tapping each other could be interpreted as a "button press," or a gesture of a rotating thumb and finger may be interpreted as a turning a dial.

In some embodiments, the radar transceiver device 201, or portions of the radar transceiver device 201 may be implemented in a package (such as the RF circuitry/antenna package 103 described above with reference to FIG. 1A) that contains radar circuitry 205, the first transmitter front end 203, the second transmitter front end 209, the receiver front end 211, as well as the transmit antennas 213a and 213b, and the receive antennas 215a-215d. In other embodiments, the radar transceiver device 201 may be implemented as one or more integrated circuits disposed on a circuit board, and the transmit antennas 213a and 213b and the receive antennas 215a-215d may be implemented on the circuit board adjacent to the integrated circuits. Various methods of operation of a gesture sensing system (such as the mm-wave gesture sensing system 200) have been described in U.S. application Ser. No. 14/954,198, filed on Nov. 30, 2015, which application is hereby incorporated herein by reference in its entirety.

Figure 3A:
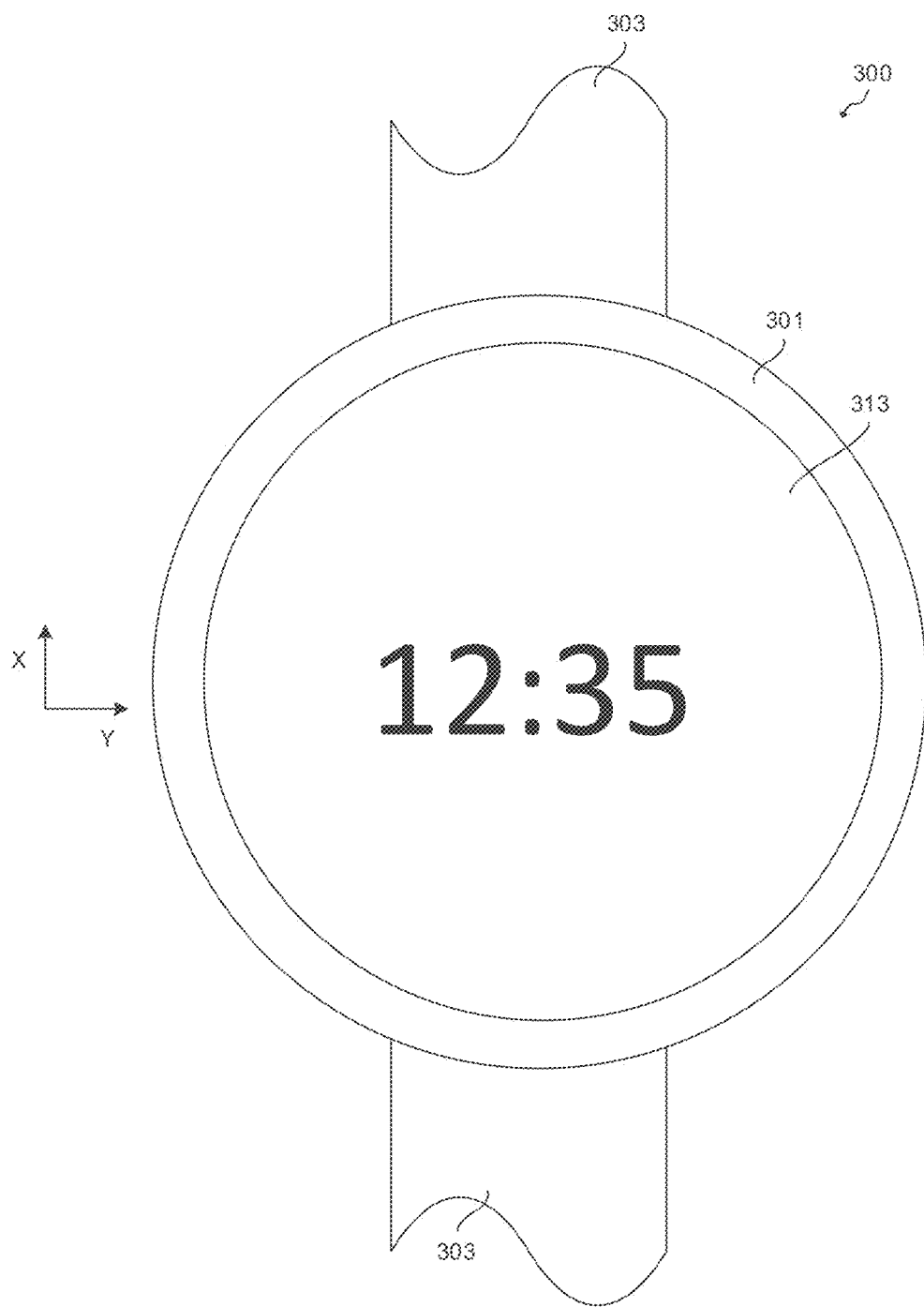
FIG. 3A illustrates a top view of a wearable device in accordance with some embodiments.
Figure 3B:
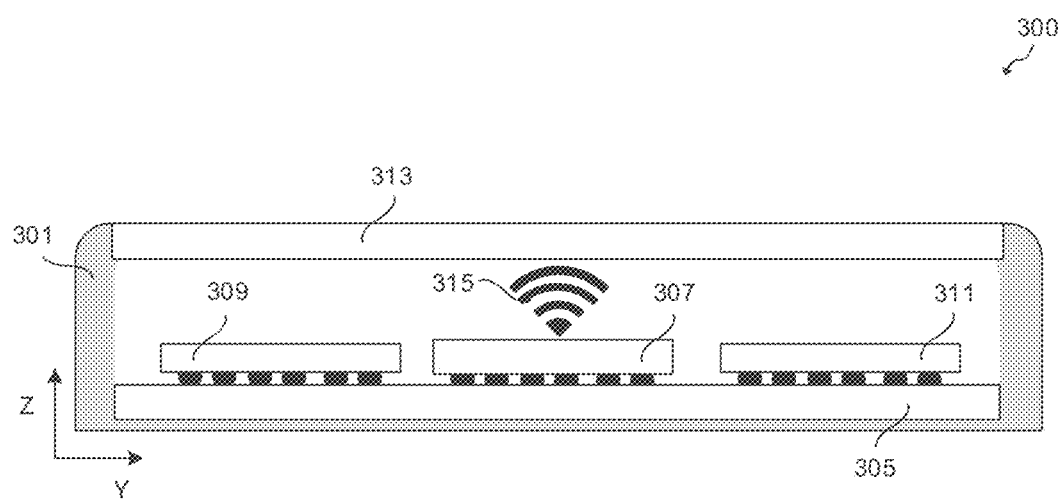
FIG. 3B illustrates a cross-sectional view of a wearable device in accordance with some embodiments.

FIGS. 3A and 3B illustrate top and cross-sectional views, respectively, of a wearable device 300 in accordance with some embodiments. In the illustrated embodiment, the wearable device 300 is a smart watch. Alternatively, the wearable device 300 may be a health monitoring system, an activity monitoring system, or like. The wearable device 300 includes a housing 301, which houses various components of the wearable device 300, acts as a mechanical support and provides protection to various components of the wearable device 300. The housing 301 may be formed using any suitable material providing desired support and protection to various components of the wearable device 300. For example, the housing 301 may be formed using metals, metal alloys, or the like. The wearable device 300 further includes a band 303 attached to the housing 301 and configured to attach the wearable device 300 to a wrist of a consumer, for example. The band 303 is not illustrated in FIG. 3B, since FIG. 3B shows a cross-sectional view in the YZ plane.

The wearable device 300 further includes a circuit board 305, which electrically couples various electrical components or devices mounted on the circuit board 305. The circuit board 305 may be formed using similar materials and methods as the circuit board 101 described above with reference to FIG. 1A, and the description is not repeated herein for the sake of brevity. In an embodiment, an RF circuitry/antenna package 307 and various electrical components (represented by two electrical components 309 and 311 in FIG. 3B) are mounted on the circuit board 305 to form a gesture sensing system (such as, for example, the mm-wave gesture sensing system 200 described above with reference to FIG. 2). The RF circuitry/antenna package 307 may be similar to the RF circuitry/antenna package 103 described above with reference to FIG. 1A, and the description is not repeated herein for the sake of brevity. The electrical components 309 and 311 may include a crystal oscillator (Xtal), a phase locked loop (PLL) circuit, baseband amplifiers, analog-to-digital converters (ADCs), switches, a power management integrated circuit (PMIC), or the like.

As shown, the wearable device 300 further includes a display 313 coupled to the circuit board 305. The display 313 covers the circuit board 305 and various electrical components or devices mounted on the circuit board 305, such as the RF circuitry/antenna package 307. The display 313 may be an LCD, an LED display, an AMOLED display, or the like. One of ordinary skill in the art will appreciate that the circuit board 305 may further include additional components (not shown) depending on functional requirement of the wearable device 300. In some embodiments, the circuit board 305 may include various application specific integrated circuits (ASICs), various components for powering and controlling the display 313, various sensors, such as a motion sensor, a pressure sensor, a temperature sensor, a humidity sensor, a touch sensor, a heart rate sensor, or the like, various interface components, such as USB, WiFi, WiGig, Bluetooth, or the like, various power management components, and a power source, such as a battery, or the like.

In an embodiment, receive antennas of the RF circuitry/antenna package 307 have a radiation pattern similar to the radiation pattern 111 illustrated in FIG. 1B. Accordingly, the receive antennas of the RF circuitry/antenna package 307 have a highest gain predominantly in the Z direction. In such embodiments, mm-wave RF signals 315 received by the RF circuitry/antenna package 307 are blocked by the display 313 or a top portion of the housing 301, since the display 313 or the top portion of the housing 301 are formed of materials that are not transparent for mm-wave RF signals. In an embodiment, the display 313 of the wearable device 300 is reshaped, such that the reshaped display 313 does not block the RF signals 315 of the RF circuitry/antenna package 307. Alternatively, the RF circuitry/antenna package 307 is placed in a location of the wearable device 300 (such as, for example, a junction of the housing 301 and the band 303 of the wearable device 300) that is not obstructed by the display 313.

As described below in greater detail, in other embodiments, an RF circuitry/antenna package may be configured such that antennas of the RF circuitry/antenna package have a highest gain predominantly in the Y direction. In such embodiments, a portion or an entire sidewall of the housing 301 is formed of a material that is transparent for mm-wave RF signals to ensure proper operation of a gesture sensing system of a wearable device.

Figure 4A:
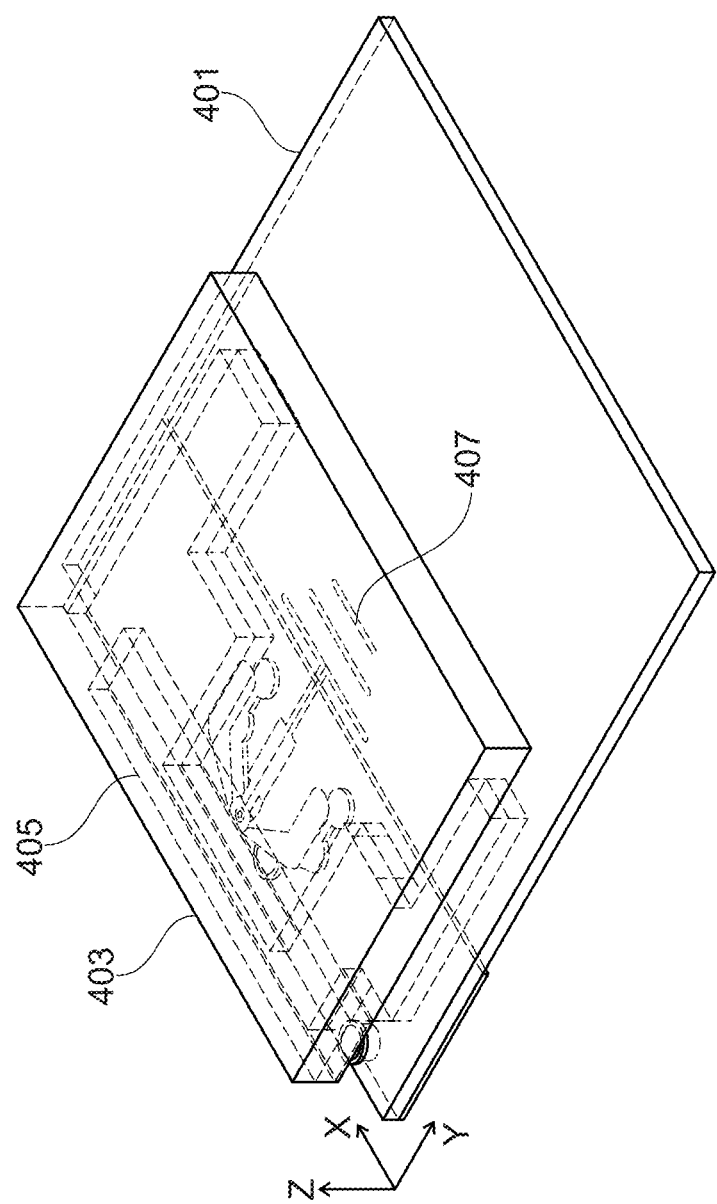
FIG. 4A illustrates a perspective view of an RF circuitry/ antenna package mounted on a circuit board in accordance with some embodiments.

FIG. 4A illustrates a perspective view of a portion of an RF circuitry/antenna package 403 mounted on a circuit board 401 in accordance with some embodiments. The circuit board 401 may be formed using similar materials and methods as the circuit board 101 described above with reference to FIG. 1A, and the description is not repeated herein for the sake of brevity. As shown, the RF circuitry/antenna package 403 includes an RF front-end IC die 405 coupled to a receive antenna 407, which is implemented using a Yagi-Uda antenna with a radiation pattern having a main lobe in the Y direction (see FIG. 4B). In other embodiments, other directional antennas, such as a Vivaldi antenna, a bow-tie antenna, or the like, may be used to implement the receive antenna 407.

Figure 4B:
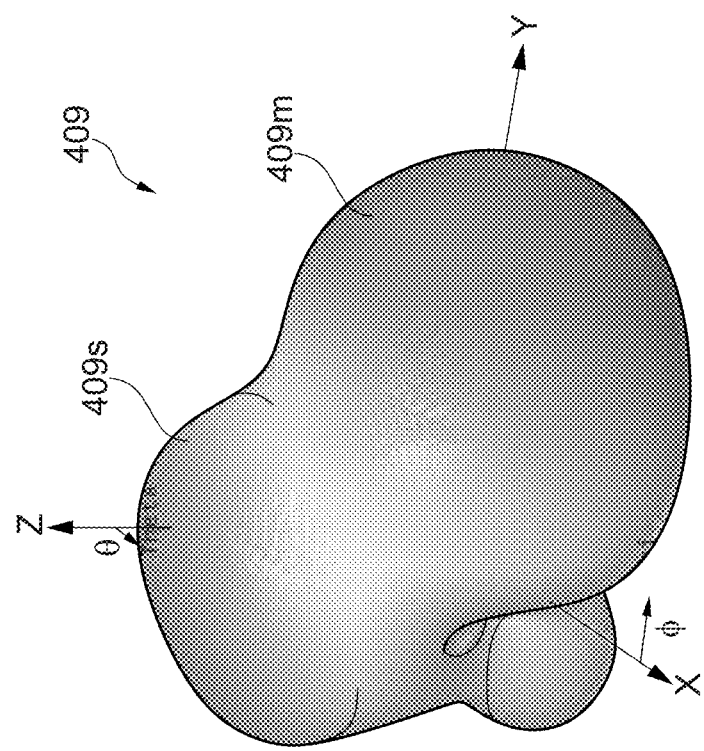
FIG. 4B illustrates a three-dimensional plot showing a radiation pattern of an RF circuitry/antenna package in accordance with some embodiments.
Figure 4B:
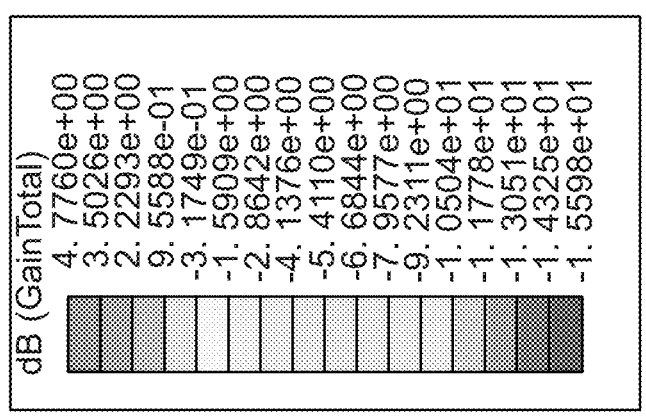

FIG. 4B illustrates a three-dimensional plot showing a radiation pattern 409 of the RF circuitry/antenna package 403, where the receive antenna 407 is implemented using a Yagi-Uda antenna. Compared to the radiation pattern 111 illustrated in FIG. 1B, the radiation pattern 409 shows a pronounced directionality in the Y direction. In an embodiment, the radiation pattern 409 has a main lobe $409m$ in the Y direction. Furthermore, the radiation pattern 409 has a side lobe $409s$ in the Z direction, with the side lobe $409s$ having a similar gain as the main lobe $409m$.

Figure 4C:
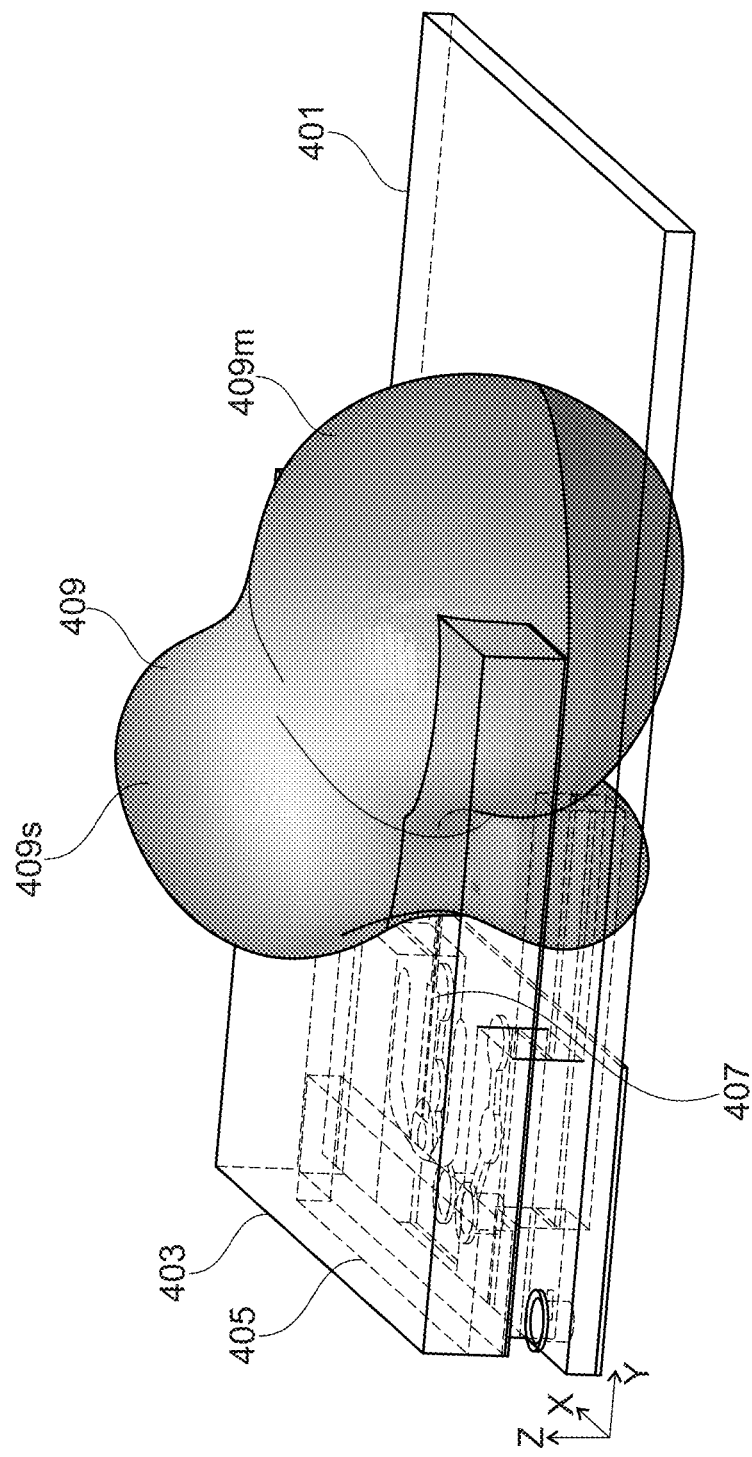
FIG. 4C illustrates a perspective view of an RF circuitry/ antenna package mounted on a circuit board with a corresponding radiation pattern in accordance with some embodiments.

FIG. 4C illustrates a perspective view of the RF circuitry/antenna package 403 mounted on the circuit board 401 with the corresponding radiation pattern 409 in accordance with some embodiments. In particular, FIG. 4C illustrates a location of the radiation pattern 409 with respect to the receive antenna 407 and other components of the RF circuitry/antenna package 403. As described below in greater detail, the main lobe $409m$ of the radiation pattern 409 may be increased by suppressing the side lobe $409s$ of the radiation pattern 409 using a reflector layer placed on top of the RF circuitry/antenna package (see FIGS. 5A, 5B and 5C).

Figure 5A:
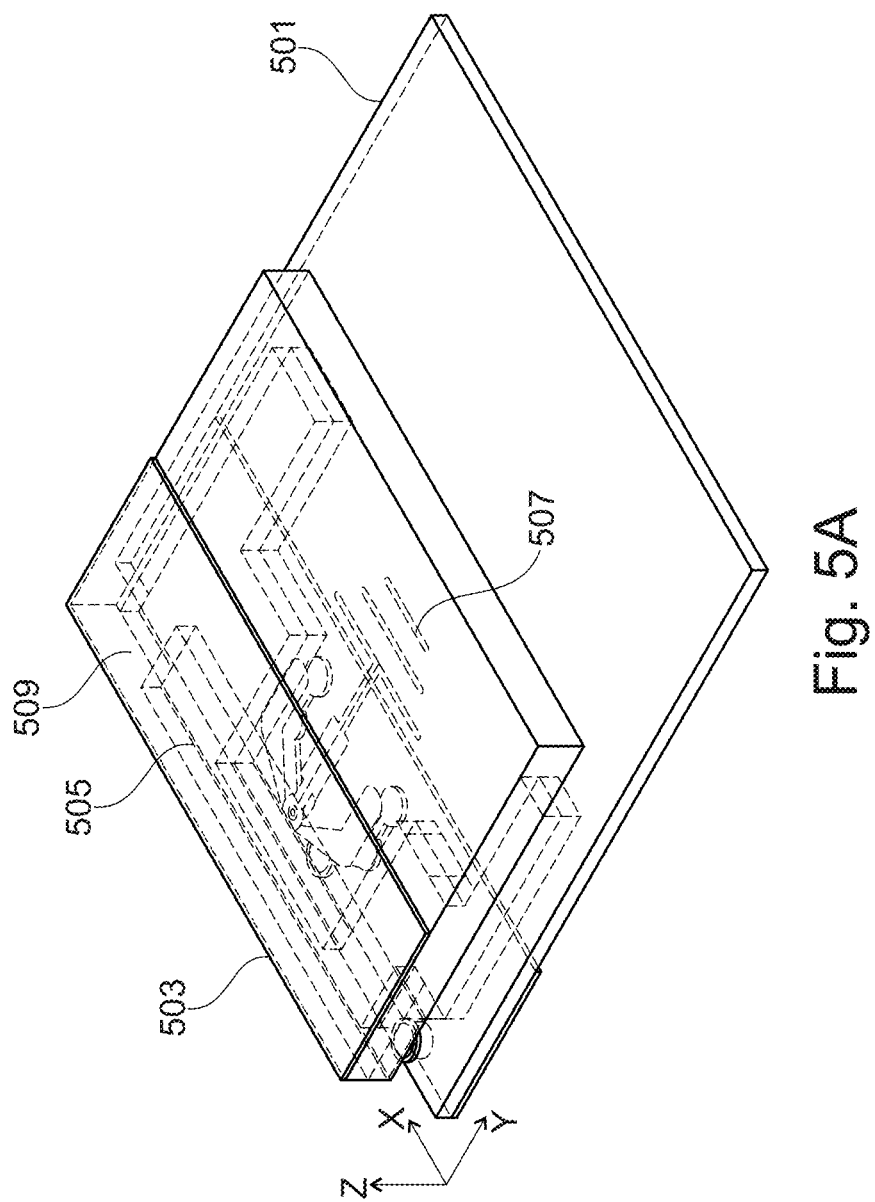
FIG. 5A illustrates a perspective view of an RF circuitry/ antenna package mounted on a circuit board in accordance with some embodiments.

FIG. 5A illustrates a perspective view of a portion of an RF circuitry/antenna package 503 mounted on a circuit board 501 in accordance with some embodiments. The circuit board 501 may be formed using similar materials and methods as the circuit board 101 described above with reference to FIG. 1A, and the description is not repeated herein for the sake of brevity. In an embodiment, the RF circuitry/antenna package 503 includes an RF front-end IC die 505 coupled to a receive antenna 507, which is implemented using a Yagi-Uda antenna with a radiation pattern having a main lobe in the Y direction (see FIG. 5B). In other embodiments, other directional antennas, such as a Vivaldi antenna, a bow-tie antenna, or the like, may be used to implement the receive antenna 507.

Referring further to FIG. 5A, a reflector layer 509 is formed over a top surface of the RF circuitry/antenna package 503 such that reflector layer 509 is formed over the RF front-end IC die 505 and at least partially over the receive antenna 507. The reflector layer 509 may be formed of a metallic material, such as aluminum, silver, coper, alloys thereof, or the like. As shown, the reflector layer 509 is formed over the RF circuitry/antenna package 503 after forming the RF circuitry/antenna package 503. In such an embodiment, the reflector layer 509 may be attached to the top surface of the RF circuitry/antenna package 503 using a suitable adhesive. Subsequently, the RF circuitry/antenna package 503 with the attached reflector layer 509 may be mounted on the circuit board 501. In another embodiment, the reflector layer 509 is formed over the RF circuitry/antenna package 503 after mounting the RF circuitry/antenna package 503 on the circuit board 501.

In yet another embodiment, the reflector layer 509 may be attached to the RF front-end IC die 505 during a packaging process to form the RF circuitry/antenna package 503. In such an embodiment, the reflector layer 509 may be a liquid metal pad and may be attached to the top surface of the RF front-end IC die 505 before encapsulating the RF front-end IC die 505. After attaching the reflector layer 509 to the top surface of the RF front-end IC die 505, the reflector layer 509 and the RF front-end IC die 405 may be encapsulated in a molding material to form the RF circuitry/antenna package 503.

Figure 5B:
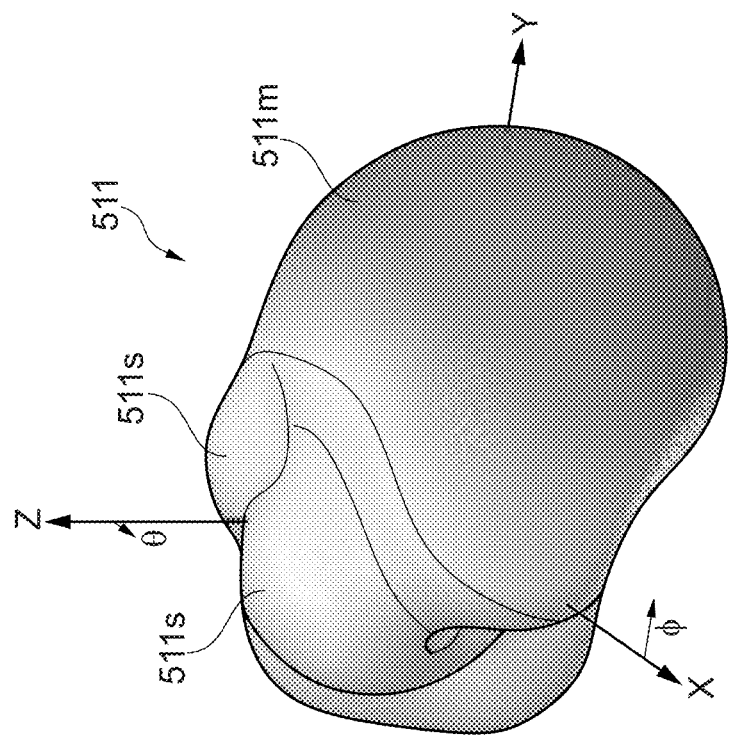
FIG. 5B illustrates a three-dimensional plot showing a radiation pattern of an RF circuitry/antenna package in accordance with some embodiments.
Figure 5B:
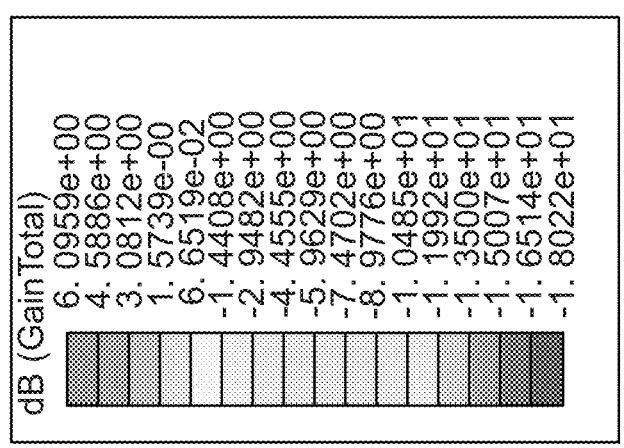

FIG. 5B illustrates a three-dimensional plot showing a radiation pattern 511 of the RF circuitry/antenna package 503, where the receive antenna 507 is implemented using a Yagi-Uda antenna, and where the reflector layer 509 is formed over the RF front-end IC die 505 and the receive antenna 507 of the RF circuitry/antenna package 503. In an embodiment, the radiation pattern 511 has a main lobe $511m$ and side lobes $511s$, with the main lobe $511m$ being in the Y direction and the side lobes $511s$ being in the XZ plane. Compared to the radiation pattern 409 illustrated in FIG. 4B, the side lobes $511s$ of the radiation pattern 511 are smaller than the side lobe $409s$ of the radiation pattern 409. In an embodiment, the reflector layer 509 reflects the RF energy in the side lobes $511s$ and redirects the RF energy to the main lobe $511m$. Accordingly, the main lobe $511m$ is pronounced, while the side lobes $511s$ are suppressed.

Figure 5C:
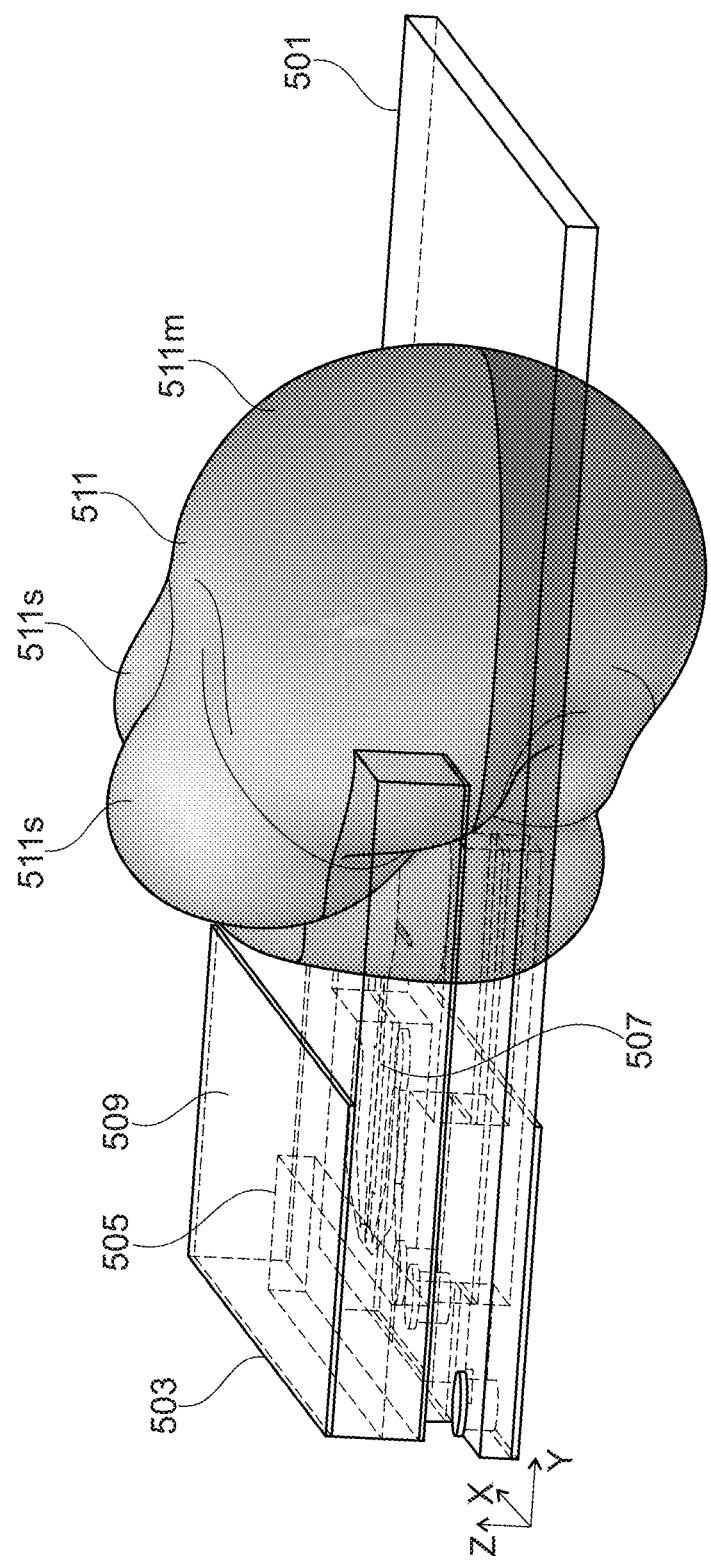
FIG. 5C illustrates a perspective view of an RF circuitry/ antenna package mounted on a circuit board with a corresponding radiation pattern in accordance with some embodiments.

FIG. 5C illustrates a perspective view of the RF circuitry/antenna package 503 mounted on the circuit board 501 with the corresponding radiation pattern 511 in accordance with some embodiments. In particular, FIG. 5C illustrates a location of the radiation pattern 511 with respect to the receive antenna 507, the reflector layer 509, and other components of the RF circuitry/antenna package 503.

Figure 6A:
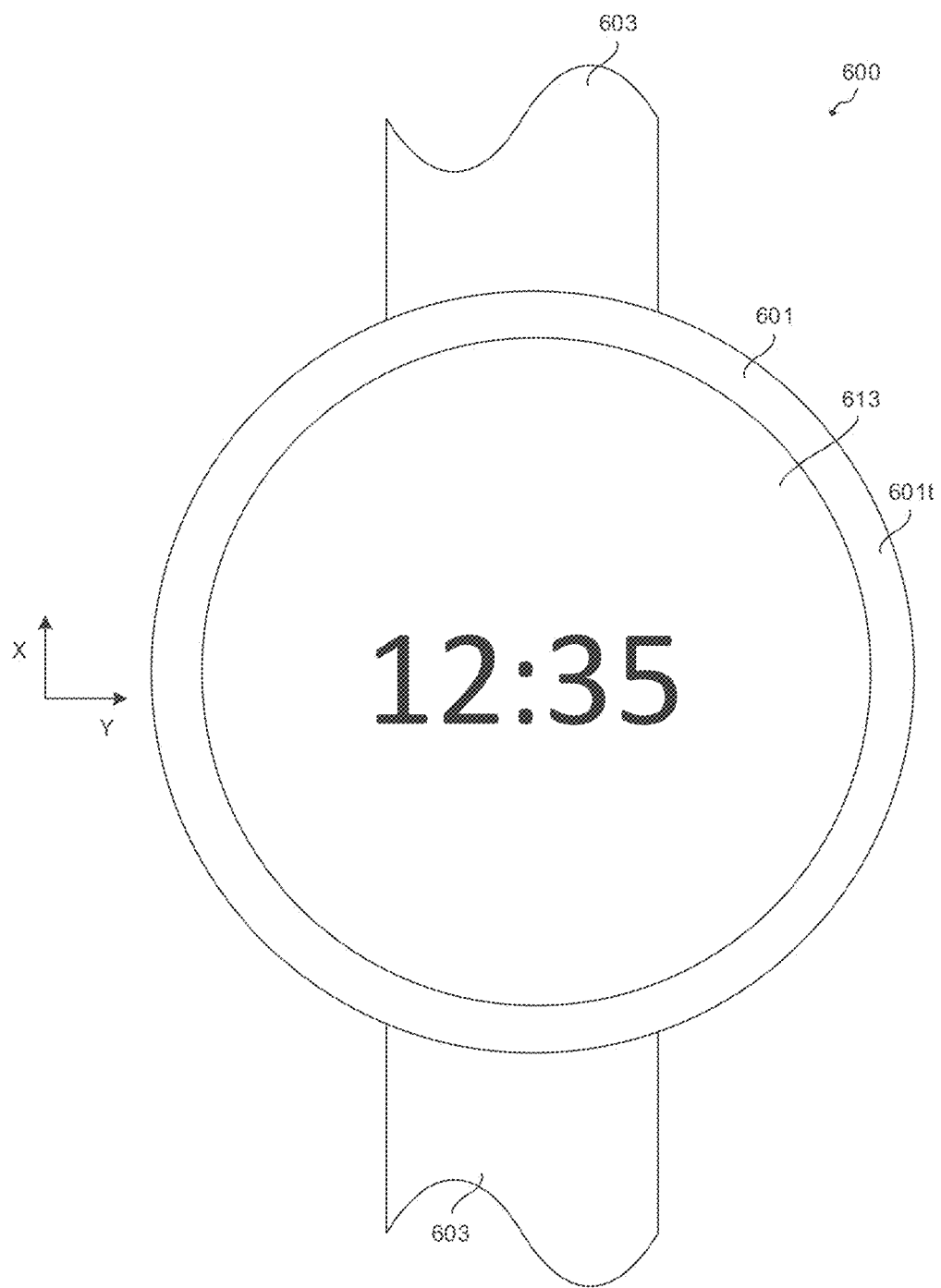
FIG. 6A illustrates a top view of a wearable device in accordance with some embodiments.
Figure 6B:
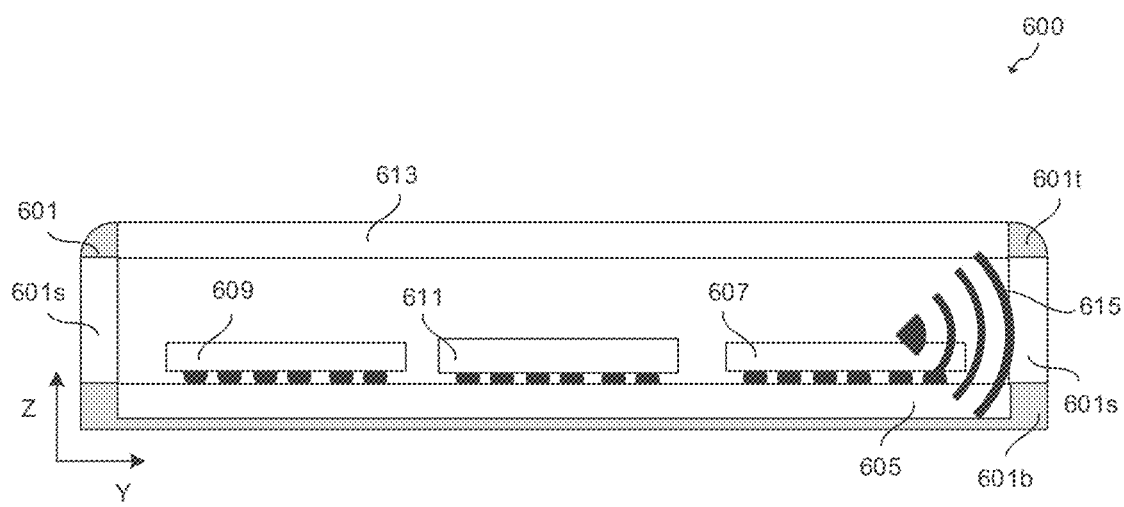
FIG. 6B illustrates a cross-sectional view of a wearable device in accordance with some embodiments.

FIGS. 6A and 6B illustrate top and cross-sectional views, respectively, of a wearable device 600 in accordance with some embodiments. In the illustrated embodiment, the wearable device 600 is a smart watch. Alternatively, the wearable device 600 may be a health monitoring system, an activity monitoring system, or like. The wearable device 600 includes a housing 601, which houses various components of the wearable device 600, acts as a mechanical support and provides protection to various components of the wearable device 600. In an embodiment, the housing 601 includes a top portion $601t$, a bottom portion $601b$, and sidewalls $601s$ separating the top portion $601t$ from the bottom portion $601b$. The top portion $601t$ and the bottom portion $601b$ of the housing 601 may be formed of metals, metal alloys, or the like. In an embodiment, at least a portion of the sidewalls $601s$ of the housing 601 may be formed of a suitable material that is transparent for mm-wave RF signals. The wearable device 600 further includes a band 603 attached to the housing 601 and configured to attach the wearable device 600 to a wrist of a consumer, for example. The band 603 is not illustrated in FIG. 6B, since FIG. 6B shows a cross-sectional view in the YZ plane.

The wearable device 600 further includes a circuit board 605, which electrically couples various electrical components or devices mounted on the circuit board 605. The circuit board 605 may be formed using similar materials and methods as the circuit board 101 described above with reference to FIG. 1A, and the description is not repeated herein for the sake of brevity. In an embodiment, the RF circuitry/antenna package 607 and various electrical components (represented by two electrical components 609 and 611 in FIG. 6B) are mounted on the circuit board 605 to form a gesture sensing system (such as the mm-wave gesture system described above with reference to FIG. 2). The RF circuitry/antenna package 607 may be implemented using the RF circuitry/antenna package 403 described above with reference to FIG. 4A, or the RF circuitry/antenna package 503 described above with reference to FIG. 5A. The electrical components 609 and 611 may include a crystal oscillator (Xtal), a phase locked loop (PLL) circuit, baseband amplifiers, analog-to-digital converters (ADCs), switches, a power management integrated circuit (PMIC), or the like.

The wearable device 600 further includes a display 613 coupled to the circuit board 605. The display 613 covers the circuit board 605 and various electrical components mounted to the circuit board 605, such as the RF circuitry/antenna package 607. The display 613 may be an LCD, an LED display, an AMOLED display, or the like. One of ordinary skill in the art will appreciate that the circuit board 605 may include additional components (not shown) depending on functional requirement of the wearable device 600. In some embodiments, the circuit board 605 may further include various application specific integrated circuits (ASICs), various components for powering and controlling the display 613, various sensors, such as a motion sensor, a pressure sensor, a temperature sensor, a humidity sensor, a touch sensor, a heart rate sensor, or the like, various interface components, such as USB, WiFi, WiGig, Bluetooth, or the like, various power management components, and a power source, such as a battery, or the like.

Referring further to FIG. 6B, in an embodiment where the RF circuitry/antenna package 607 is implemented using the RF circuitry/antenna package 403 (see FIG. 4A), the RF circuitry/antenna package 607 has a radiation pattern similar to the radiation pattern 409 illustrated in FIG. 4B. In another embodiment where the RF circuitry/antenna package 607 is implemented using the RF circuitry/antenna package 503 (see FIG. 5A), the RF circuitry/antenna package 607 has a radiation pattern similar to the radiation pattern 511 illustrated in FIG. 5B. Accordingly, the RF circuitry/antenna package 607 has a highest gain predominantly in the Y direction. In such embodiments, mm-wave RF signals 516 transmitted or received by the RF circuitry/antenna package 607 pass though the sidewall 601s of the housing 601 and are not blocked by the display 613 or the top portion 601t of the housing 601. Accordingly, the display 613 of the wearable device 600 may not be reshaped to expose the RF circuitry/antenna package 607.

Referring further to FIG. 6B, in an embodiment where the RF circuitry/antenna package 607 is implemented using the RF circuitry/antenna package 503 (see FIG. 5A), the reflector layer 509 may be configured to act as a heat sink. In such embodiments, the reflector layer 509 may be formed of a high thermal conductivity material (such as a metallic material), may be coupled to the top portion 601t of the housing 601, and may be configured to transfer heat generated in the RF front-end IC die 505 to the top portion 601t of the housing 601 to be further dissipated into the environment. Furthermore, the bottom portion 601b of the housing 601, which is in contact with skin of a consumer while worn, may be formed of a low thermal conductivity material to avoid discomfort or bodily harm to the skin of the consumer.

Figure 6C:
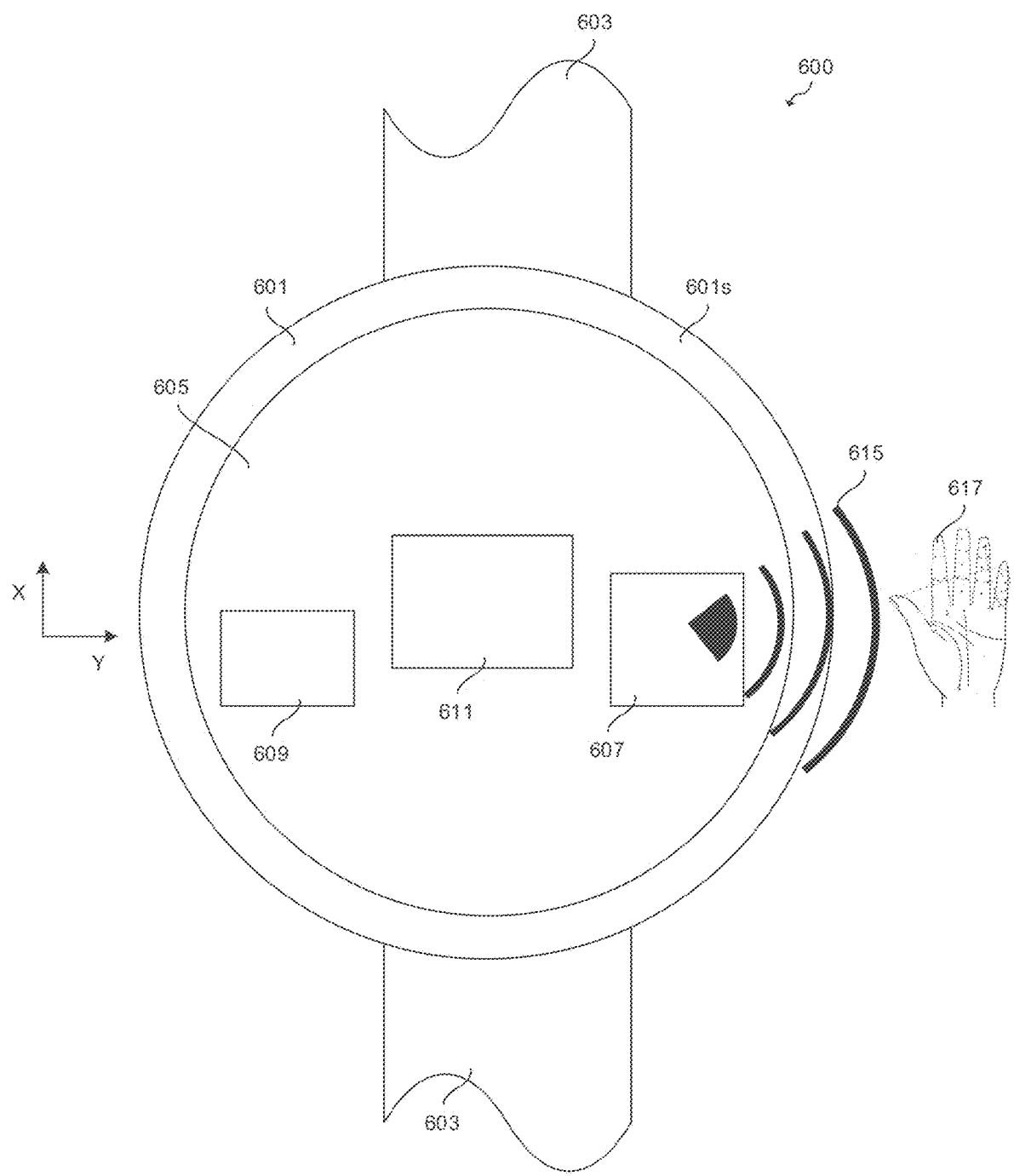
FIG. 6C illustrates a planar view of a wearable device in accordance with some embodiments.

FIG. 6C illustrates a planar view of the wearable device 600 not obscured by the display 613. In particular, FIG. 6C shows a location of the RF circuitry/antenna package 607 with respect to other components of the wearable device 600. During operation of the mm-wave gesture sensing system of the wearable device 600, the RF signals 615 that are transmitted to and reflected from a gesturing hand 617 pass through the sidewall 601s of the housing 601 and are not blocked by the display 613 (see FIGS. 6A and 6B) or the band 603 of the wearable device 600. In an embodiment, the RF signals 615 intersect with a portion of the sidewall 601s of the housing 601. In other words, high-gain directions of the RF circuitry/antenna package 607, such as directions defined by a main lobe of a radiation pattern of the RF circuitry/antenna package 607 (see, for example, the radiation patterns 409 and 511 in FIGS. 4B and 5B, respectively), intersect a portion of the sidewall 601s of the housing 601. Accordingly, the portion of the sidewall 601s of the housing 601 intersecting with the RF signals 615 is formed of a material transparent for the mm-wave RF signals. Remaining portion of the sidewall 601s of the housing 601 may be formed of a material that is not transparent for the mm-wave RF signals, such as a metallic material, for example. In other embodiments, the entire sidewall 601s of the housing 601 may be formed of a material transparent for the mm-wave RF signals.

Figure 7A:
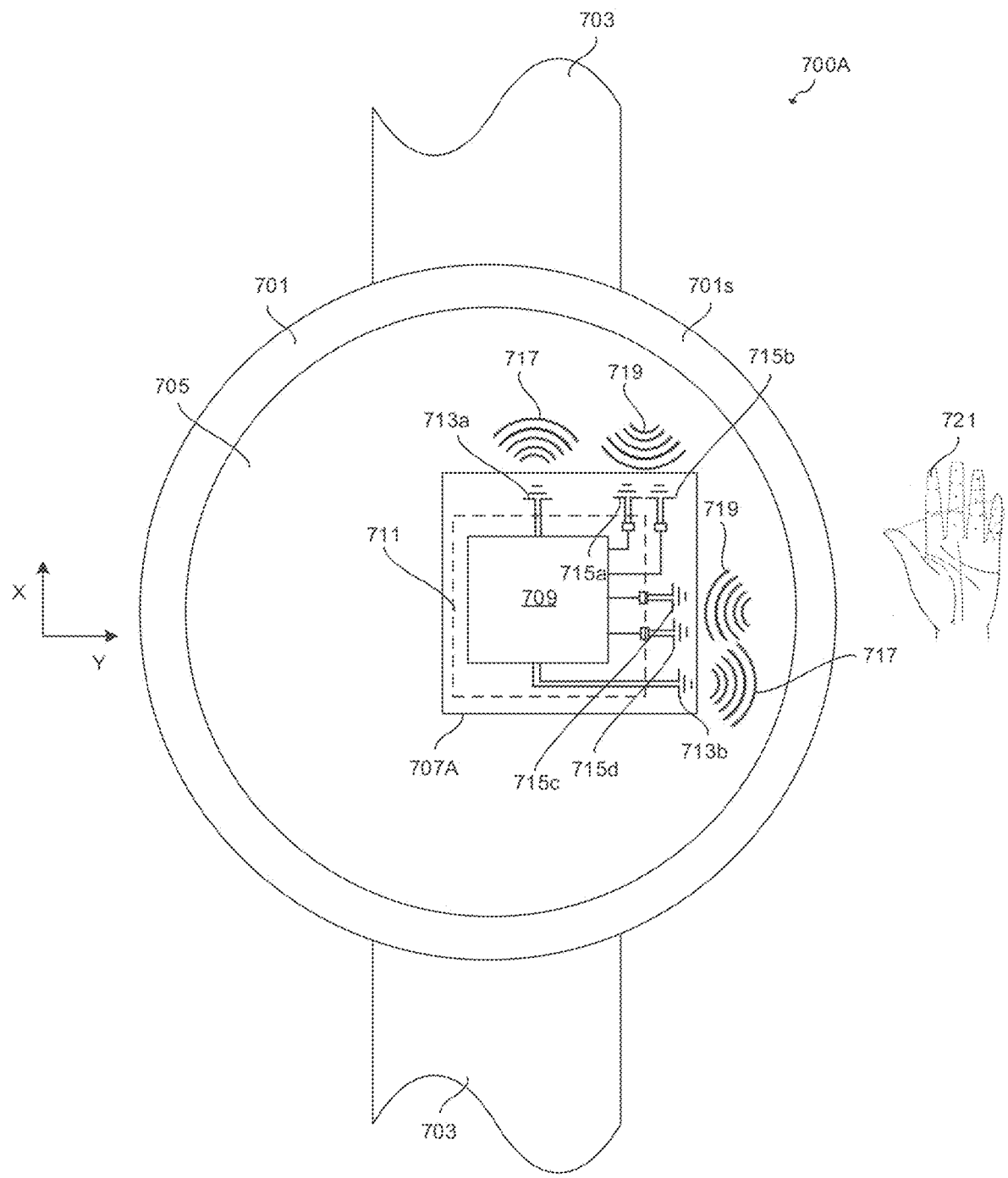
FIG. 7A illustrates a planar view of a wearable device in accordance with some embodiments.
Figure 7B:
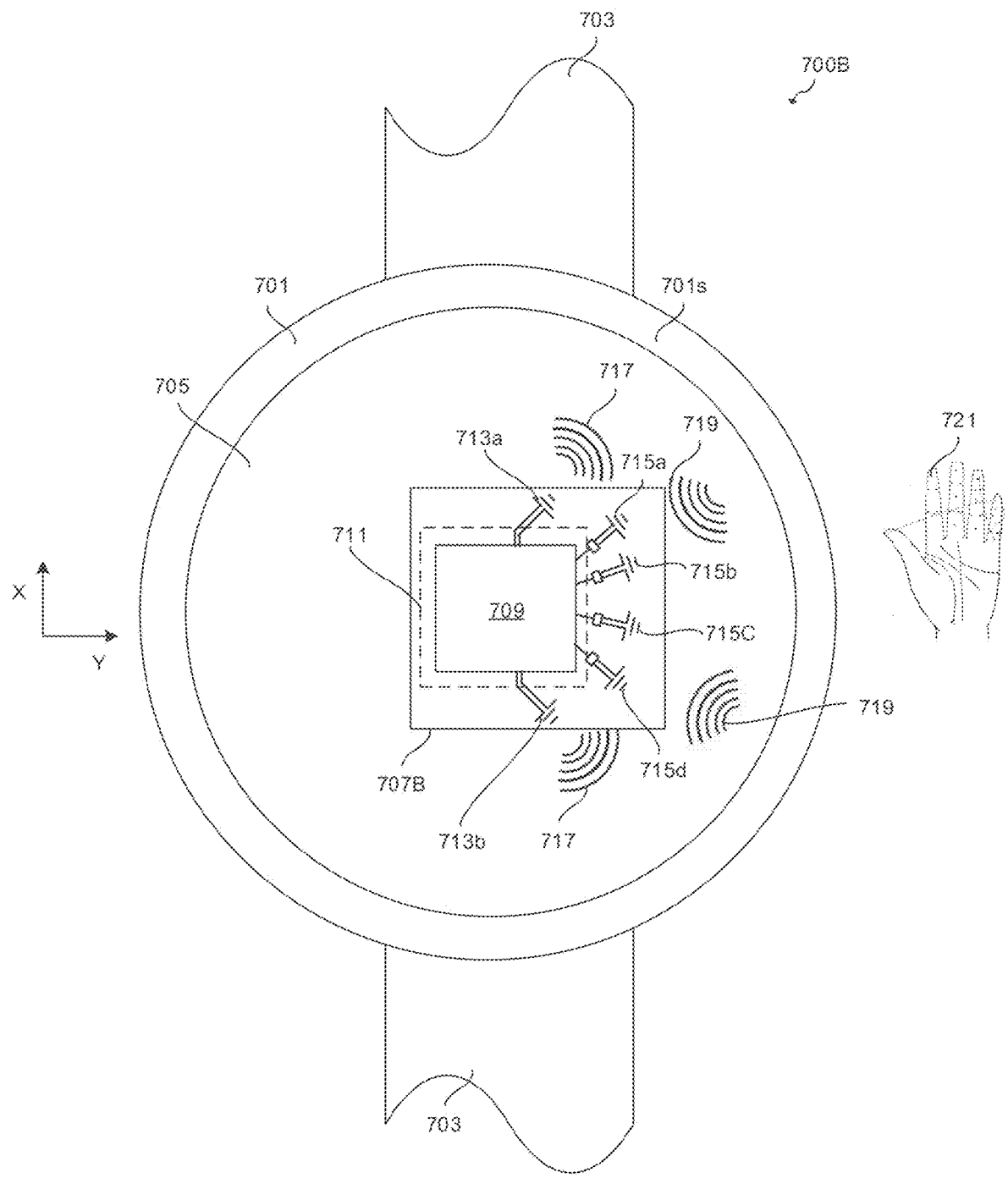
FIG. 7B illustrates a planar view of a wearable device in accordance with some embodiments.
Figure 7C:
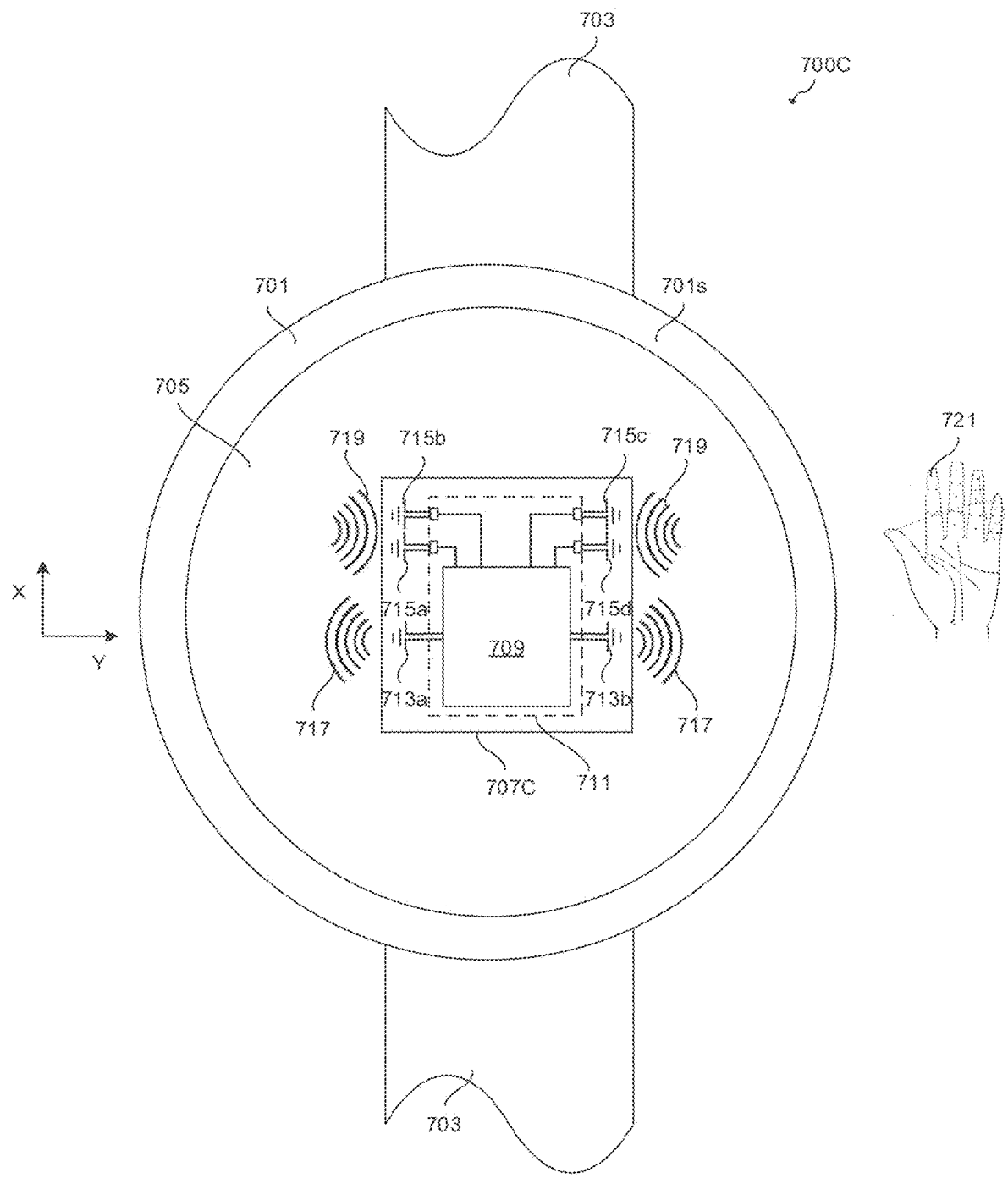
FIG. 7C illustrates a planar view of a wearable device in accordance with some embodiments.

FIGS. 7A, 7B and 7C illustrate planar views of wearable devices 700A, 700B and 700C, respectively, where receive and transmit antennas are implemented using a directional antenna, such as a Yagi-Uda antenna. Furthermore, FIGS. 7A, 7B and 7C show various antenna arrangements of respective RF circuitry/antenna packages of the wearable devices 700A, 700B and 700C. In the illustrated embodiments, the wearable devices 700A, 700B and 700C are smart watches. Alternatively, the wearable devices 700A, 700B and 700C may be health monitoring systems, activity monitoring systems, or like.

Referring to FIG. 7A, the wearable device 700A includes a housing 701, which houses various components of the wearable device 700A, acts as a mechanical support and provides protection to various components of the wearable device 700A. In an embodiment, the housing 701 includes a top portion (not shown), a bottom portion (not shown), and a sidewall 701s separating the top portion from the bottom portion. The top portion and the bottom portion of the housing 701 may be formed of metals, metal alloys, or the like. In an embodiment, at least a portion of the sidewalls 701s of the housing 701 may be formed of a suitable material that is transparent for mm-wave RF signals. The wearable device 700A further includes a band 703 that is attached to the housing 701 and is configured to attach the wearable device 700A to a wrist of a consumer, for example.

The wearable device 700A further includes a circuit board 705, which electrically couples various electrical components or devices mounted on the circuit board 705. The circuit board 705 may be formed using similar materials and methods as the circuit board 101 described above with reference to FIG. 1A, and the description is not repeated herein for the sake of brevity. In an embodiment, the RF circuitry/antenna package 707A and various electrical components (not shown) are mounted on the circuit board 705 to form a gesture sensing system (such as the mm-wave gesture system described above with reference to FIG. 2). The electrical components may include a crystal oscillator (Xtal), a phase locked loop (PLL) circuit, baseband amplifiers, analog-to-digital converters (ADCs), switches, a power management integrated circuit (PMIC), or the like.

The RF circuitry/antenna package 707A may be similar to the RF circuitry/antenna package 403 (see FIG. 4A), or similar to the RF circuitry/antenna package 503 (see FIG. 5A). In an embodiment, the RF circuitry/antenna package 707A includes an RF front-end IC die 709, transmit antennas 713a and 713b, and receive antennas 715a-715d. The RF circuitry/antenna package 707A is configured to transmit incident RF signals 717 toward a gesturing hand 721 via the transmit antennas 713a and 713b, and receive reflected RF signals 719 from the gesturing hand 721 via the receive antennas 715a-715d. The RF front-end IC die 709 includes a receiver front end (not shown) coupled to the receive antennas 715a-715d, and a transmitter front end (not shown) coupled to the transmit antennas 713a and 713b. In an embodiment, the transmit antennas 713a and 713b and the receive antennas 715a-715d are implemented using Yagi-Uda antennas. In other embodiments, other directional antennas, such as Vivaldi antennas, bow-tie antennas, or the like, may be used to implement the transmit antennas 713a and 713b and the receive antennas 715a-715d.

In an embodiment, a reflector layer 711 is formed over a top surface of the RF circuitry/antenna package 707A, such that reflector layer 711 is formed over the RF front-end IC die 709 and at least partially over the transmit antennas 713a and 713b and the receive antennas 715a-715d. The reflector layer 711 may be formed using similar materials and methods as the reflector layer 509 described above with reference to FIG. 5A, and the description is not repeated herein for the sake of brevity. In other embodiments, the reflector layer 711 may be omitted. In an embodiment where the reflector layer 711 is formed over the RF circuitry/antenna package 707A, a radiation pattern of each of the transmit antennas 713a and 713b, and the receive antennas 715a-715d may be similar to the radiation pattern 511 (see FIG. 5B). In another embodiment where reflector layer 711 is not formed over the RF circuitry/antenna package 707A, a radiation pattern of each of the transmit antennas 713a and 713b, and the receive antennas 715a-715d may be similar to the radiation pattern 409 (see FIG. 4B).

In an embodiment, the wearable device 700A further includes a display (not shown) disposed over and coupled to the circuit board 705. The display may be an LCD, an LED display, an AMOLED display, or the like. One of ordinary skill in the art will appreciate that the circuit board 705 may include additional components (not shown) depending on functional requirement of the wearable device 700A. In some embodiments, the circuit board 705 may further include various application specific integrated circuits (ASICs), various components for powering and controlling the display, various sensors, such as a motion sensor, a pressure sensor, a temperature sensor, a humidity sensor, a touch sensor, a heart rate sensor, or the like, various interface components, such as USB, WiFi, WiGig, Bluetooth, or the like, various power management components, and a power source, such as a battery, or the like.

Referring further to FIG. 7A, during operation of the RF circuitry/antenna package 707A of the wearable device 700A, the incident RF signals 717 that are transmitted to and the reflected RF signals 719 that are reflected from the gesturing hand 721 pass through the sidewall 701s of the housing 701 and are not blocked by the display or the band 703 of the wearable device 700A. In an embodiment, the incident RF signals 717 and the reflected RF signals 719 intersect with a portion of the sidewall 701s of the housing 701. In other words, high-gain directions of the RF circuitry/antenna package 707A, such as directions defined by main lobes of the radiation patterns of the RF circuitry/antenna package 707A (see, for example, the radiation patterns 409 and 511 in FIGS. 4B and 5B, respectively), intersect a portion of the sidewall 701s of the housing 701. Accordingly, the portion of the sidewall 701s of the housing 701 intersecting with the incident RF signals 717 and the reflected RF signals 719 is formed of a material that is transparent for the mm-wave RF signals. Remaining portion of the sidewall 701s of the housing 701 may be formed of a material that is not transparent for the mm-wave RF signals, such as a metallic material, for example. In other embodiments, the entire sidewall 701s of the housing 701 may be formed of a material transparent for the mm-wave RF signals.

Referring to FIG. 7B, the wearable device 700B is similar to the wearable device 700A described above with reference to FIG. 7A, and the description is not repeated herein for the sake of brevity. An RF circuitry/antenna package 707B of the wearable device 700B differs from the RF circuitry/antenna package 707A of the wearable device 700A by an arrangement of the transmit antennas 713a and 713b, and the receive antennas 715a-715d. Similar to the wearable device 700A, the incident RF signals 717 and the reflected RF signals 719 of the wearable device 700B intersect with a portion of the sidewall 701s of the housing 701, which is formed of a material that is transparent for the mm-wave RF signals. Furthermore, since the transmit antennas 713a and 713b, and the receive antennas 715a-715d of the RF circuitry/antenna package 707B have a different arrangement than the transmit antennas 713a and 713b, and the receive antennas 715a-715d of the RF circuitry/antenna package 707A, the portion of the sidewall 701s of the wearable device 700B that is transparent for the mm-wave RF signals is different from the portion of the sidewall 701s of the wearable device 700A that is transparent for the mm-wave RF signals. The RF circuitry/antenna package 707B of the wearable device 700B operates in a similar manner as the RF circuitry/antenna package 707A of the wearable device 700A described above with reference to FIG. 7A, and the description is not repeated herein for the sake of brevity.

Referring to FIG. 7C, the wearable device 700C is similar to the wearable devices 700A and 700B described above with reference to FIGS. 7A and 7B, respectively, and the description is not repeated herein for the sake of brevity. An RF circuitry/antenna package 707C of the wearable device 700C differs from the RF circuitry/antenna packages 707A and 707B of the wearable devices 700A and 700B, respectively, by an arrangement of the transmit antennas 713a and 713b, and the receive antennas 715a-715d. Similar to the wearable devices 700A and 700B, the incident RF signals 717 and the reflected RF signals 719 of the wearable device 700C intersect with a portion of the sidewall 701s of the housing 701, which is formed of a material that is transparent for the mm-wave RF signals. Furthermore, since the transmit antennas 713a and 713b, and the receive antennas 715a-715d of the RF circuitry/antenna package 707C have a different arrangement than the transmit antennas 713a and 713b, and the receive antennas 715a-715d of the RF circuitry/antenna packages 707A and 707B, the portion of the sidewall 701s of the wearable device 700C that is transparent for the mm-wave RF signals is different from the portions of the sidewalls 701s of the wearable devices 700A and 700B that are transparent for the mm-wave RF signals.

In the illustrated embodiment, the portion of the sidewall 701s of the wearable device 700C that is transparent for the mm-wave RF signals includes two disconnected portions, such that the disconnected portions are located on opposite sides of the sidewall 701s of the housing 701 of the wearable device 700C. The RF circuitry/antenna package 707C of the wearable device 700C operates in a similar manner as the RF circuitry/antenna package 707A of the wearable device 700A described above with reference to FIG. 7A, and the description is not repeated herein for the sake of brevity.

Figure 8:
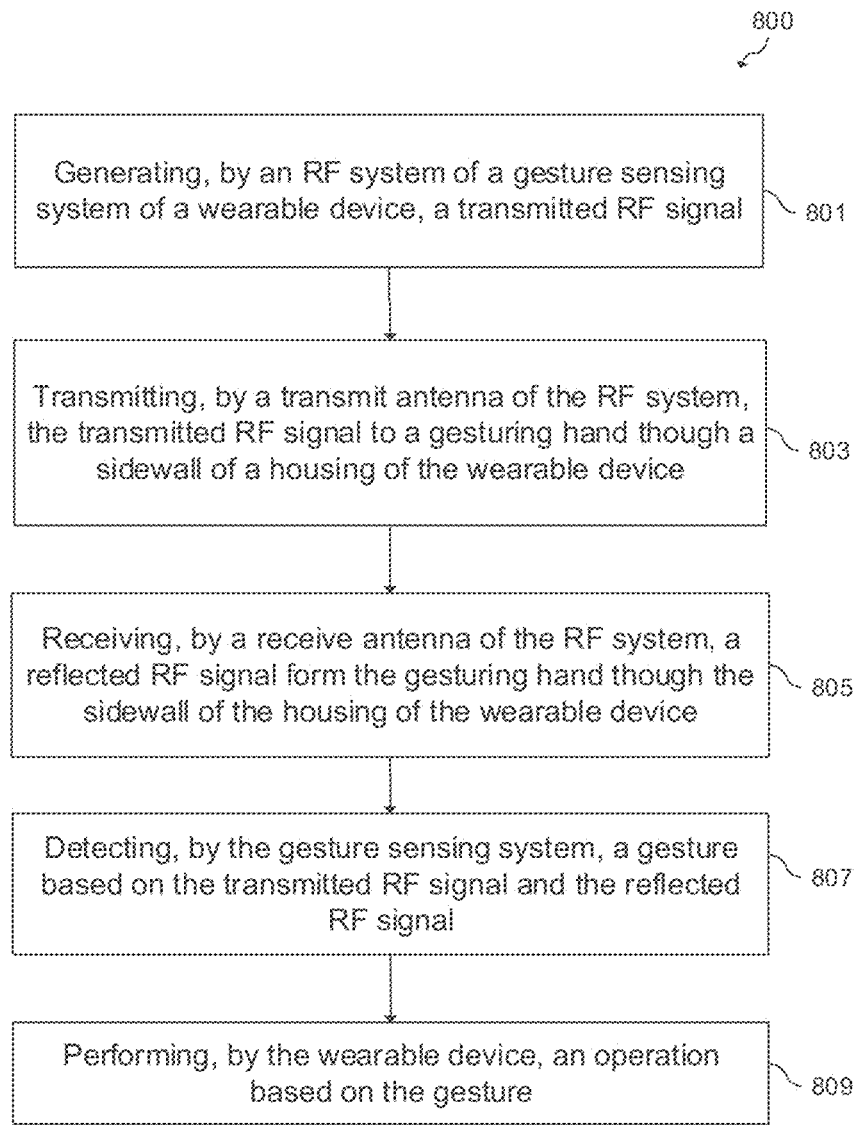
FIG. 8 illustrates a flow diagram of a method of operating a gesture sensing system integrated into a wearable device in accordance with some embodiments.

FIG. 8 illustrates a flow diagram of a method 800 of operating a gesture sensing system integrated into a wearable device in accordance with some embodiments. The method 800 starts at step 801, where an RF system (such as, for example, the RF circuitry/antenna packages 707A, 707B and 707C illustrated in FIGS. 7A, 7B and 7C, respectively) of the gesture sensing system (such as, for example, the mm-wave gesture sensing system 200 illustrated in FIG. 2) of the wearable device (such as, for example, the wearable devices 700A, 700B and 700C illustrated in FIGS. 7A, 7B and 7C, respectively) generates a transmitted RF signal. In step 803, a transmit antenna (such as, for example, the transmit antennas 713a and 713b illustrated in FIGS. 7A, 7B and 7C) transmits the transmitted RF signal (such as, for example, the incident RF signals 717 illustrated in FIGS. 7A, 7B and 7C) to a gesturing hand (such as, for example, the gesturing hand 721 illustrated in FIGS. 7A, 7B and 7C) though a portion of the sidewall of the housing (such as, for example, the sidewall 701s of the housing 701 illustrated in FIGS. 7A, 7B and 7C) of the wearable device. The transmitted RF signal is transmitted according to a radiation pattern (such as, for example, the radiation patterns 409 or 511 illustrated in FIGS. 4B and 5B, respectively). In an embodiment, a highest gain direction of a main lobe of the radiation pattern intersects with the sidewall of the housing of the wearable device, such that the transmitted RF signal overlaps with the portion of the sidewall of the housing of the wearable device. In step 805, a receive antenna (such as, for example, the receive antennas 715a-715d illustrated in FIGS. 7A, 7B and 7C) receives a reflected RF signal (such as, for example, the RF signals 719 illustrated in FIGS. 7A, 7B and 7C) from the gesturing hand though the portion of the sidewall of the housing of the wearable device. In step 807, the gesture sensing system detects a gesture based on the transmitted RF signal and the reflected RF signal. In an embodiment, the gesture sensing system may compare the reflected RF signal to the transmitted RF signal to detect the gesture. In step 809, the wearable device performs an operation based on the gesture.

Embodiments of the present disclosure are summarized here. Other embodiments can also be understood form the entirety of the specification and the claims filed herein. One general aspect includes a radio frequency (RF) system including: an RF integrated circuit (IC) die; an antenna coupled to the RF IC die; and a reflector layer over the RF IC die, the reflector layer extending over at least a portion of the antenna, a combination of the antenna and the reflector layer having a radiation pattern that includes a main lobe in a first direction parallel to a top surface of the reflector layer.

Implementations may include one or more of the following features. The RF system where the reflector layer includes a metal or a metal alloy. The RF system where the reflector layer is configured to act as a heat sink for the RF IC die. The RF system further including a molding material encapsulating the RF IC die and the reflector layer. The RF system where the antenna is a Yagi-Uda antenna. The RF system where the radiation pattern has a side lobe in a second direction perpendicular to the first direction. The RF system where the reflector layer is configured to redirect an energy of RF signals from the second direction to the first direction.

Another general aspect includes a wearable device including: a housing, the housing having a top portion, a bottom portion, and a sidewall connecting the top portion to the bottom portion; a circuit board within the housing and over the bottom portion of the housing; a radio frequency (RF) system mounted on the circuit board, the RF system including: an RF integrated circuit (IC) die; an antenna coupled to the RF IC die; and a reflector layer over the RF IC die and the antenna; and a display disposed over the RF system, where a radiation pattern of the RF system has a main lobe in a first direction parallel to a top surface of the display, and where the first direction intersects with the sidewall of the housing.

Implementations may include one or more of the following features. The wearable device where the RF IC die includes radar circuitry coupled to the antenna. The wearable device further including gesture recognizing processing circuitry coupled to the RF IC die. The wearable device where the radiation pattern has a side lobe in a second direction perpendicular to the first direction, the second direction intersecting with the display. The wearable device where a gain of the main lobe is greater than a gain of the side lobe. The wearable device where the top portion of the housing and the bottom portion of the housing include a metal or a metal alloy. The wearable device where at least a portion of the sidewall of the housing is formed of a material transparent for mm-wave RF signals. The wearable device where a portion of the sidewall of the housing is not transparent for mm-wave RF signals. The wearable device where the reflector layer includes a metal or a metal alloy. The wearable device where the reflector layer is configured to provide a heat dissipation path from the RF IC die to the top portion of the housing. The wearable device where the top portion of the housing includes a high thermal conductivity material. The wearable device where the bottom portion of the housing includes a low thermal conductivity material. The wearable device where the wearable device is a smart watch.

Another general aspect includes a method including: generating, by a radio frequency (RF) system of a wearable device, a transmitted RF signal; transmitting, by a transmit antenna of the RF system according to a radiation pattern, the transmitted RF signal to an object through a first portion of a sidewall of a housing of the wearable device, where a highest gain direction of a main lobe of the radiation pattern intersects with the first portion of the sidewall of the housing of the wearable device; and receiving, by a receive antenna of the RF system, a reflected RF signal from the object through the first portion of the sidewall of the housing of the wearable device.

Implementations may include one or more of the following features. The method where the object is a gesturing hand. The method further including: detecting, by the RF system, a gesture of the gesturing hand based on the transmitted RF signal and the reflected RF signal; and performing, by the wearable device, an operation based on the gesture. The method where the first portion of the sidewall of the housing of the wearable device includes a first material, where a second portion of the sidewall of the housing of the wearable device includes a second material different from the first material. The method where the second portion of the sidewall of the housing of the wearable device is not transparent for the transmitted RF signal and the reflected RF signal. The method where the first portion of the sidewall of the housing of the wearable device is transparent for the transmitted RF signal and the reflected RF signal. The method where the wearable device is a smart watch.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device comprising:
a housing, the housing having a top portion, a bottom portion, and a sidewall connecting the top portion to the bottom portion;
a circuit board within the housing and over the bottom portion of the housing; and
a radio frequency (RF) system mounted on a first side of the circuit board, wherein a radiation pattern of the RF system has a main lobe in a first direction parallel to first side of the circuit board, and wherein the first direction intersects with the sidewall of the housing.

2. The device of claim 1, wherein the RF system comprises:
an RF integrated circuit (IC) die;
an antenna coupled to the RF IC die; and
a reflector layer over the RF IC die and the antenna.

3. The device of claim 2, wherein the reflector layer comprises a conductive material.

4. The device of claim 2, wherein the reflector layer comprises a high thermal conductivity material.

5. The device of claim 1, further comprises a display disposed over the RF system, wherein the first direction is parallel to a top surface of the display.

6. The device of claim 1, wherein the radiation pattern further has a side lobe in a second direction perpendicular to the first direction, the second direction intersecting with the circuit board.

7. The device of claim 6, wherein a gain of the main lobe is greater than a gain of the side lobe.

8. A device comprising:
a housing;
a mm-wave gesture sensing system within the housing, the mm-wave gesture sensing system comprising a radio frequency (RF) system; and
a display disposed over the mm-wave gesture sensing system, wherein the RF system having a radiation pattern comprising a main lobe in a first direction parallel to a top surface of the display, and wherein the first direction intersects with a sidewall of the housing.

9. The device of claim 8, wherein the RF system comprises:
an RF circuitry coupled to an antenna; and
a conductive layer over the RF circuitry and the antenna, wherein the conductive layer extends over at least a portion of the antenna.

10. The device of claim 9, wherein the antenna is a directional antenna.

11. The device of claim 9, wherein the conductive layer is configured to act as a heat sink.

12. The device of claim 8, wherein the radiation pattern has a side lobe in a second direction perpendicular to the first direction.

13. The device of claim 8, wherein at least a portion of the sidewall of the housing is formed of a material transparent for mm-wave RF signals.

14. The device of claim 8, further comprising a circuit board, wherein the mm-wave gesture sensing system is mounted on the circuit board.

15. A device comprising:
a housing, the housing having a top portion, a bottom portion, and a sidewall portion extending between the top portion and the bottom portion;
a circuit board between the top portion and the bottom portion of the housing;
a mm-wave gesture sensing system mounted on the circuit board, the mm-wave gesture sensing system comprising a radio frequency (RF) system, the RF system comprising:
an RF circuitry; and
an antenna coupled to the RF circuitry; and
a display disposed over the mm-wave gesture sensing system, wherein a highest gain direction of a main lobe of a radiation pattern of the RF system intersects with the sidewall portion of the housing, and wherein the highest gain direction of the main lobe of the radiation pattern of the RF system is parallel to a top surface of the display.

16. The device of claim 15, wherein the RF system comprises a reflector layer over the RF circuitry and the antenna, at least a portion of the antenna being interposed between the reflector layer and the circuit board.

17. The device of claim 15, wherein a portion of the sidewall portion of the housing intersecting with the highest gain direction comprises a material transparent for mm-wave RF signals.

18. The device of claim 15, wherein the antenna is a directional antenna.

19. The device of claim 15, wherein the top portion of the housing comprises a metallic material.

20. The device of claim 15, wherein the bottom portion of the housing comprises a low thermal conductivity material.

* * * * *